(12) United States Patent
Hohl et al.

(10) Patent No.: US 9,165,066 B2
(45) Date of Patent: Oct. 20, 2015

(54) METHOD AND SYSTEM FOR GENERATING A USER MUSIC TASTE DATABASE, METHOD FOR SELECTING A PIECE OF MUSIC FOR RECOMMENDATION, MUSIC PIECE SELECTION SYSTEM AND DATA PROCESSING SYSTEM

(71) Applicant: Sony Corporation, Minato-ku (JP)

(72) Inventors: Fritz Hohl, Stuttgart (DE); Thomas Kemp, Esslingen am Neckar (DE)

(73) Assignee: Sony Corporation, Tokyo (JP)

( * ) Notice: Subject to any disclaimer, the term of this patent is extended or adjusted under 35 U.S.C. 154(b) by 237 days.

(21) Appl. No.: 13/907,061

(22) Filed: May 31, 2013

(65) Prior Publication Data

US 2013/0332471 A1 Dec. 12, 2013

(30) Foreign Application Priority Data

Jun. 12, 2012 (EP) ..................................... 12004425

(51) Int. Cl.
*G06F 17/30* (2006.01)

(52) U.S. Cl.
CPC ...... *G06F 17/3074* (2013.01); *G06F 17/30752* (2013.01)

(58) Field of Classification Search
USPC ............... 707/751; 700/94; 709/24; 717/124; 715/835
See application file for complete search history.

(56) References Cited

U.S. PATENT DOCUMENTS

| 7,716,220 | B2 | 5/2010 | Michelitsch et al. | |
|---|---|---|---|---|
| 7,970,922 | B2 | 6/2011 | Svendsen | |
| 7,982,117 | B2 | 7/2011 | Alcalde et al. | |
| 8,027,954 | B2 | 9/2011 | Malcolm | |
| 8,112,720 | B2 | 2/2012 | Curtis | |
| 8,131,389 | B1 * | 3/2012 | Hardwick et al. | 700/94 |
| 2007/0288903 | A1 * | 12/2007 | Manglik et al. | 717/124 |
| 2009/0182736 | A1 | 7/2009 | Ghatak | |
| 2011/0251995 | A1 | 10/2011 | Hangartner et al. | |
| 2011/0289075 | A1 | 11/2011 | Nelson | |
| 2012/0030627 | A1 * | 2/2012 | Nurmi et al. | 715/835 |
| 2012/0054277 | A1 * | 3/2012 | Gedikian | 709/204 |

OTHER PUBLICATIONS

Jun Wang, et al., "Wi-Fi Walkman: A wireless handhold that shares and recommends music on peer-to-peer networks", SPIE-IS&T, vol. 5683, 2005, pp. 155-163.

* cited by examiner

*Primary Examiner* — Etienne Leroux
(74) *Attorney, Agent, or Firm* — Oblon, McClelland, Maier & Neustadt, L.L.P.

(57) ABSTRACT

Generating a user music taste database, comprising determining, as a first count, a number of appearances of a selected classification identifier of classification identifiers in a user specific first set of music identifiers, wherein the classification identifiers are attributed to the music identifiers in the first set of music identifiers and determining, by the circuitry, as a second count, a number of appearances of the selected classification identifier in a second set of music identifiers, wherein classification identifiers are attributed to the music identifiers in the second set of music identifiers. A classification identifier related to the selected classification identifier is stored in an expertise list in the user music taste database, if a value determined from setting the first count and the second count in relation to each other is equal to or larger than a predetermined expertise level threshold value.

11 Claims, 42 Drawing Sheets

200
first set

| Music Identifier | Classification Identifier |
|---|---|
| MID1 | CID1 |
| MID2 | CID1 |
| MID3 | CID2 |
| MID4 | CID3 |

205
second set

| Music Identifier | Classification Identifier |
|---|---|
| MID1 | CID1 |
| MID2 | CID1 |
| MID3 | CID2 |
| MID4 | CID3 |
| MID5 | CID1 |
| MID6 | CID1 |
| MID7 | CID3 |
| MID8 | CID3 |
| MID9 | CID4 |
| MID10 | CID1 |

METHOD AND SYSTEM FOR GENERATING A USER MUSIC TASTE DATABASE, METHOD FOR SELECTING A PIECE OF MUSIC FOR RECOMMENDATION, MUSIC PIECE SELECTION SYSTEM AND DATA PROCESSING SYSTEM

BACKGROUND

1. Field of the Disclosure

The present disclosure relates to methods and systems for generating a user music taste database. Such methods and systems may be used for selecting a new piece of music that may be of interest for the user.

2. Description of Related Art

User music taste databases are used to determine the preferences of a user. By matching these preferences, expressed by corresponding meta data, the meta data being attributed to pieces of music, music pieces that may be of interest to the user are identified.

SUMMARY

A method is disclosed for generating a user music taste database. The method comprises determining, as a first count, a number of appearances of a selected classification identifier of classification identifiers in a user specific first set of music identifiers, wherein the classification identifiers are attributed to the music identifiers in the first set of music identifiers, and determining, as a second count, a number of appearances of the selected classification identifier in a second set of music identifiers, wherein classification identifiers are attributed to the music identifiers in the second set of music identifiers. Further, a classification identifier related to the selected classification identifier is stored in an expertise list in the user music taste database, if a value determined from setting the first count and the second count in relation to each other is equal to or larger than a predetermined expertise level threshold value.

Further, a method is disclosed for generating a user music taste database, comprising identifying user preferences associated with music pieces over a first time period and storing the user preferences of the first time period in the user music taste database as general music taste database, identifying user preferences associated with music pieces over a second time period and storing the user preferences of the second time period in the user music taste database as current music taste database. The first time period includes a time period that reaches further in the past than the second time period.

Further, a data processing system is disclosed, comprising a first memory to store a user specific first set of music identifiers, wherein classification identifiers are attributed to the music identifiers in the first set of music identifiers, and a circuit configured to perform the functions of determining, as a first count, the number of appearances of a selected classification identifier of the classification identifiers in the user specific first set of music identifiers for pieces of music, determining, as a second count, the number of appearances of the selected classification identifier in a second set of music identifiers for pieces of music, wherein classification identifiers are attributed to the music identifiers in the second set of music identifiers, and storing, if a value determined from setting the first count and the second count in relation to each other is equal to or larger than a predetermined expertise level threshold value, a classification identifier related to the selected classification identifier in an expertise list in the user music taste database in the first memory or a second memory.

Further, a data processing system is disclosed, comprising a first memory to store user preferences in association with a time label, and a circuit configured to perform the functions of identifying the user preferences associated with music pieces with the time label corresponding to a first time period, identifying the user preferences associated with music pieces with the time label corresponding to a second time period, wherein the first time period includes a time period that reaches further in the past than the second time period, and storing in the first memory or a second memory the user preferences of the first time period in a user music taste database as general music taste database and storing the user preferences of the second time period in the user music taste database as current music taste database.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
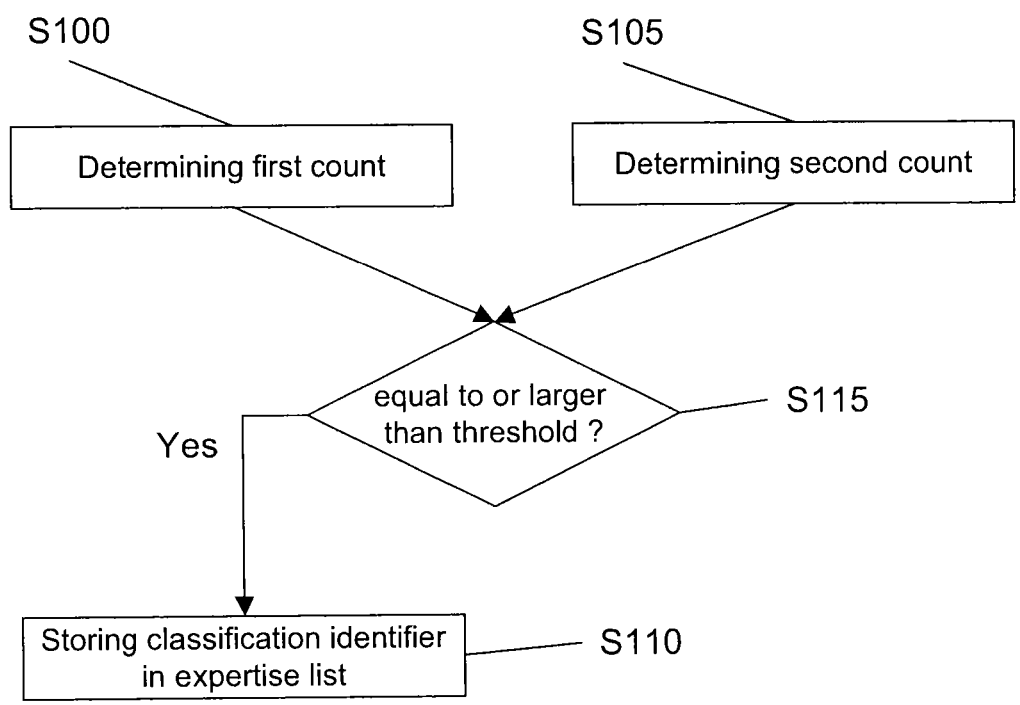
FIG. 1 illustrates a flow chart of one embodiment for generating a user music taste database including an expertise list.

Referring now to the drawings, like reference numerals designate identical or corresponding parts throughout the several views. Further, several of the drawings show numbers, names, tables, lists only for improving the clarity of the embodiments that are described by referring to the drawings. All these numbers, names, tables, lists are only illustrations of generic terms and may replaced by other corresponding elements, e.g. other numbers, names, tables, lists.

FIG. 1 illustrates a flow chart of one embodiment of the method for generating a user music taste database including an expertise list in which a classification identifier is comprised.

A user music taste database is an electronically storable database representing the taste of a specific user and may be generated from information derived from interactions of the user with an electronic device or electronic devices. Such an electronic device may be a smart phone, a feature phone, a PPA, a tablet PC, a mp3-player, a computer with an internet link, a radio or television set with a user interface, and alike.

An expertise list comprises data specific for the user reflecting the expertise of the user with respect to the classification identifier. The classification identifier may be a performer identifier or a genre identifier, and alike.

A user may be considered as an expert for a genre represented in the database by a genre identifier as a classification identifier if the user knows (or is supposed to know e.g. based on the music he or she listens or listened to or owns) equal to or more than an expertise level threshold value related to this genre, e.g. a certain percentage of the bands attributed to this genre. The expression "genre" has the meaning of a class or category of artistic endeavor having a particular form, content, technique, or the like. The genre identifier may be equal to the genre or a different expression attributed to the genre. A genre may be classic, rock, pop, heavy metal, eastern, folk, orchestra, chamber, live, cover, film, music and alike.

A user may be considered as an expert for a band represented in the database by a performer identifier as a classification identifier if the user knows (or is supposed to know e.g. based on the music he or she listens or listened to or owns) equal to or more than an expertise level threshold value related to this band, e.g. a certain percentage of the pieces of music of this band. The expression "band" has the meaning of any performing artist even if there is e.g. only a single individual or an orchestra. The band identifier may be equal to the name of the band or a different expression attributed to the band.

A "piece of music" may denote a discrete work in the field of music and may also be called song, track or a like. "Discrete work" may be an individual piece within a collection of pieces or the complete collection. For example a musical or an opera as a whole may be included in a database as a single piece of music, or the individual songs of a musical or an opera may be included in a database as a plurality of pieces of music. Pieces of music may be tracks on a CD, songs played in the radio, music trailers of television movies or the like. Pieces of music may be represented by music identifiers in the database. Such music identifiers may be a title or a specific code for a piece of music. The music identifiers allow distinguishing one piece of music from another piece of music. By selecting the appropriate criteria for distinguishing one piece of music from another, it may for example be possible to identify versions of a song as separate pieces of music, but differently encoded representations of the same song as the same piece of music. Same pieces of music may be represented by the same music identifier.

As illustrated in FIG. 1, in one embodiment the method comprises determining S100, as a first count, a number of appearances of a selected classification identifier of classification identifiers in a user specific first set of music identifiers, wherein the classification identifiers are attributed to the music identifiers in the first set of music identifiers, and determining S105, as a second count, a number of appearances of the selected classification identifier in a second set of music identifiers, wherein classification identifiers are attributed to the music identifiers in the second set of music identifiers. The second count may have been determined in advance. After determining the first count and the second count, a classification identifier related to the selected classification identifier in an expertise list is stored S110 in the user music taste database, if a value determined from setting the first count and the second count in relation to each other is equal to or larger than a predetermined expertise level threshold value S115. The value determined from setting the first count and the second count in relation to each other may be a measure for a user's expertise level with respect to the corresponding classification identifier.

The first set of music identifiers represents pieces of music which the user has somehow interacted with. This interaction may be that the user has played the song on an electronic device, e.g. the piece of music is identified in a user playlist, the user has purchased it, the user has rated the piece of music as being liked or disliked or the user has collected the pieces of music in a user song database. The corresponding information may be stored in a user playlist memory or a user song memory, respectively.

Thus, the first set of music identifiers reflects the music experience of the user. A first set 200 of music identifiers may be a list of music identifiers, MID1 to MID4 in FIG. 2, wherein classification identifiers CID1 to CID3 are attributed to the music identifiers (or vice versa). In this example, the pieces of music with music identifiers MID1 and MID2 are attributed to the same classification identifier CID1, e.g. because they might belong to the same genre or might be performed by the same band.

The second set of music identifiers may be completely independent from the user. It may be a general database including music identifiers of a much larger number of pieces of music. The second set of music identifiers may be a database of a provider of pieces of music or of a service provider that may be stored in a global song memory. The second set 205 of music identifiers may correspond in its structure to the first set 200 of music identifiers, however the second set 205 my comprise more music identifiers, MID1 to MID 10 in FIG. 2, wherein classification identifiers CID1 to CID4 are attributed to the music identifiers.

Assessing the first set 200 in relation to the second set 205 of music identifiers for a selected classification identifier allows judging whether the user has a large expertise and may be considered as an expert with regard to that classification identifier, e.g. with regard to the genre or band that is classified by the corresponding classification identifier. The threshold may be preset so that the method may be automated.

Figures 2, 3:
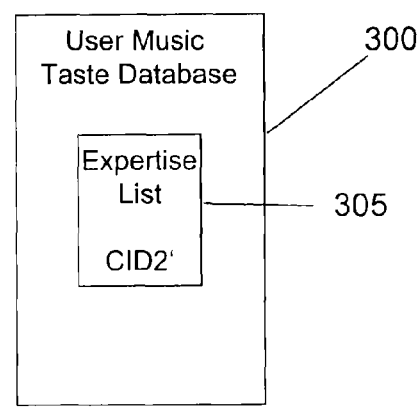
FIG. 2 schematically illustrates a first set of music identifiers and a second set of music identifiers to which classification identifiers are attributed.
FIG. 3 schematically illustrates a user music taste database with an expertise list included therein.

The stored user music taste database 300 may include an expertise list 305 in which a classification identifier CID2' is stored, as illustrated in FIG. 3. The stored classification indicator CID2' may be different from the selected classification indicator CID2 as will be described in more detail below.

The classification identifier for which the count is determined may be arbitrarily selected. The classification identifier is not necessarily a classification identifier that is attributed to a music identifier in the first and or second set of music identifiers, especially not in the first set of music identifiers. The classification identifier may for example be selected by a user that wants to obtain a recommendation for a piece of music using the functionality of the user music taste database or a classification identifier may for example be selected by a content provider that wants to know if for the respective classification identifier a piece of music may be recommended using the functionality of the user music taste database. Further, the method may be carried out for all classification identifiers attributed to music identifiers of the first set of music identifiers or in the second set of music identifiers. This may allow generating a complete music taste database reflecting an overview on the user's music taste at the time of carrying out the method.

Figure 4:
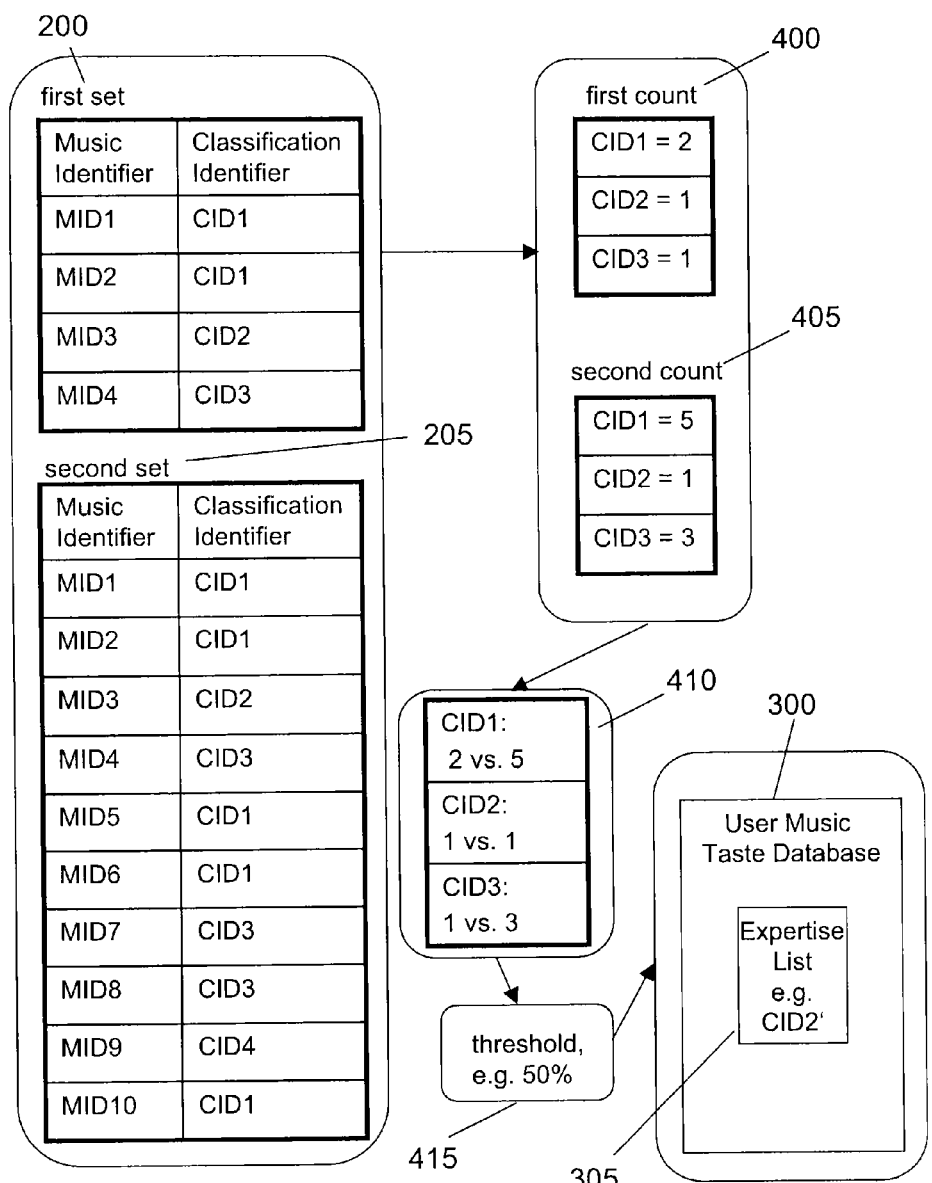
FIG. 4 is a chart schematically showing the method according to the embodiment illustrated in FIG. 1 based on arbitrarily selected first and second sets of music identifiers with attributed classification identifiers.

FIG. 4 is a chart schematically showing an example of the method of FIG. 1 based on arbitrarily selected first set 200 and second set 205 of music identifiers with attributed classification identifiers CID. FIG. 4 shows in one chart the result of the method that is carried out for three selected classification identifiers CID1, CID2, CID3. It is noted that the method may be carried out selectively and independently for each of the classification identifiers CID1, CID2, CID3. In the example of FIG. 4, the classification identifier CID1 is attributed to the music identifiers MID1 and MID2, the classification identifier CID2 is attributed to MID3, and the classification identifier CID3 is attributed to MID4 in the first set of music identifiers 200. Further, the classification identifier CID1 is attributed to MID1, MID2, MID5, MID6 and MID10, the classification identifier CID2 is attributed to MID3, the classification identifier CID3 is attributed to MID4, MID1 and MID8, and the classification identifier CID4 is attributed to MID9 in the second set of music identifiers 205. The first count 400 is determined from the first set 200 and the second count 405 is determined from the second set 205, e.g. in FIG. 4 CID1 appears twice in the first set 200 (attributed to MID1 and MID2) and CID1 appears five times in the second set 205 (attributed to MID1, MID2, MID5, MID6, and MID10). CID2 appears once in the first set 200 (attributed to MID3) and CID2 appears also once in the second set 205 (attributed to MID3). Obviously, the number of appearances of the same classification identifier may differ in the first set 200 and the second set 205. Thus, the first count vs. the second count differs 410 for the different classification identifiers CID1, CID2, CID3, e.g. for CID1 first count vs. second count is 2 vs. 5 and for CID2 first count vs. second count is 1 vs. 1.

Only if the first count 400 in relation to the second count 405 is equal to or larger than a predetermined expertise level threshold value, the corresponding related classification identifier CID2 or a derivative thereof CID2' is stored in the expertise list 305 in the user music taste database 300. For example, in FIG. 4 the expertise level threshold value is set to 50%, thus for CID1, where first count vs. second count is 2 vs. 5, i.e. 40%, the expertise level threshold value is not exceeded, but for CID2, where first count vs. second count is 1 vs. 1, i.e. 100%, the expertise level threshold value is exceeded. Accordingly, for CID2 but not for CID1 the value is equal to or above the threshold value of 50%, and the corresponding related classification identifier CID2' is stored in the expertise list 305. It is noted that even tough the number of appearances is based on a selected classification identifier (e.g. Acoustic Pop) not necessarily exactly this selected classification identifier is stored. A different classification identifier derived from the selected classification identifier, for example a more general genre such as Pop instead of Acoustic Pop may be stored.

By storing S110 the classification identifier in the expert list, a user music taste database 300 is generated. The storing may be executed upon an existing user music taste database resulting in an updating/enhancing of the user music taste database, or may be newly generated resulting in the creation of a new user music taste database.

The expertise level threshold value set for deciding S115 with respect to storing may be expressed as a percentage value. The percentage value may be 50%. Further, same or different expertise level threshold values may be used each time the method is carried out.

The expertise list 305 may be used for selecting music that is of interest for the user, for collaborative filtering or for finding other persons that have a similar music taste and expertise. Thus, the expertise list allows reducing time and energy consuming effort on the user side to search for the information. Thus, the energy and the time for running the hardware a user has to spend for searching for the information or even in view of wrong assessment of information may be reduced.

The threshold value may be set arbitrarily. It may be set by the user or the content provider. It may be the same value for every classification identifier or it may vary for different classification identifiers. The threshold value(s) may also be set individually for every user or the same threshold value(s) may be used for different users. The threshold value(s) may be fixed once they are set or the threshold value(s) may be variable value(s). The threshold value(s) may for example be set by a user who e.g. wants to obtain a recommendation for a piece of music using the functionality of the user music taste database. Thus, the user may adjust his expertise list by setting the threshold value(s) individually. The threshold value(s) may for example be set by a content provider e.g. that wants to push the recommendation of certain pieces of music. Setting the threshold value(s) by the content provider may have the effect that an experience with respect to setting reasonable threshold value(s) is used.

Further, the second count may be determined by determining the numbers of appearances of the classification identifier in a plurality of sets of music identifiers each being attributed to a different user and averaging the numbers of appearances. Alternatively the second count may be determined by an overall number of appearances in a plurality of sets of music identifiers each being attributed to a different user and dividing the number by the number of sets of music identifiers. Then the first count and the second count may be set in relation to each other and the classification identifier is only stored in the expertise list, if the first count exceeds the second count. This may allow identifying a user as an expert with respect to the classification identifier based on a comparison with a group of different users. The group of different users may be arbitrarily selected or may be a group of users having specific characteristics. Such characteristics may refer to the personal information such as age, gender, origin, nationality and alike, to a representative comparison group, a group that is having a personal relation ship to the user for which the expertise list is created, e.g. a group of friends in a social network such as facebook, LinkedIn, Xing, and alike.

Figure 5:
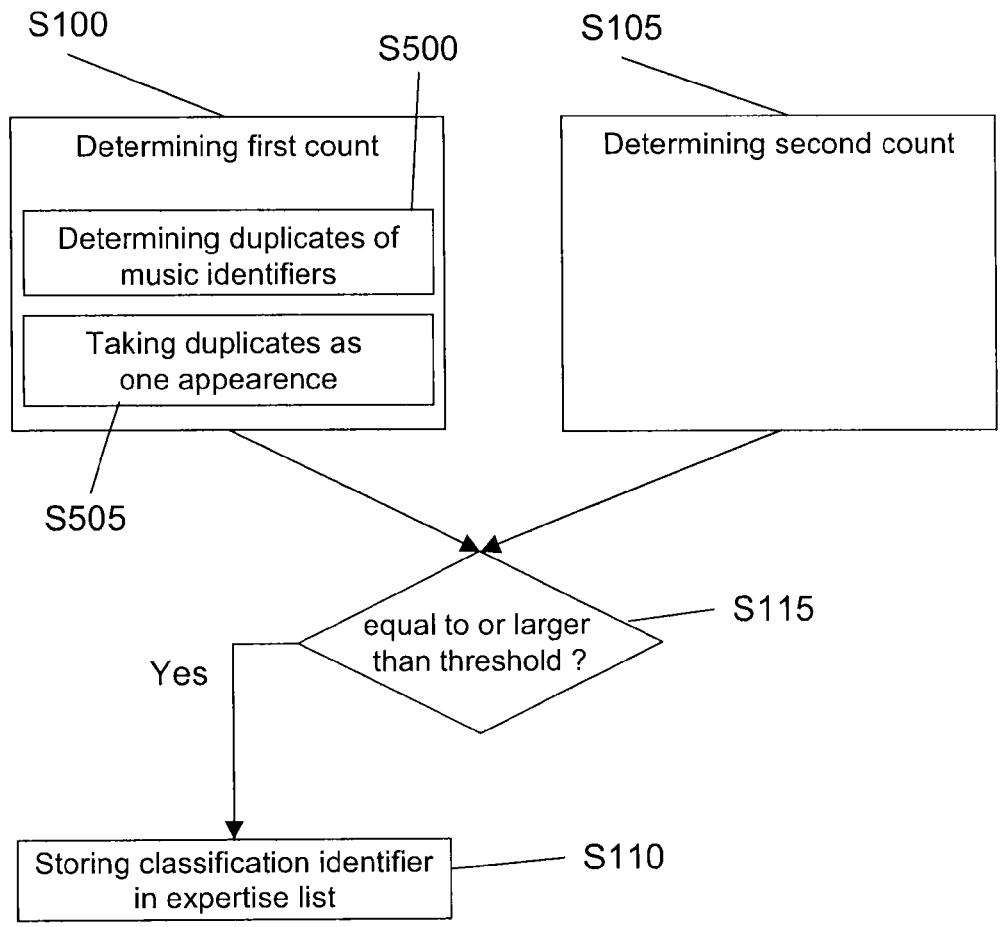
FIG. 5 illustrates a flow chart of another embodiment for generating a user music taste database including an expertise list.
Figure 6:
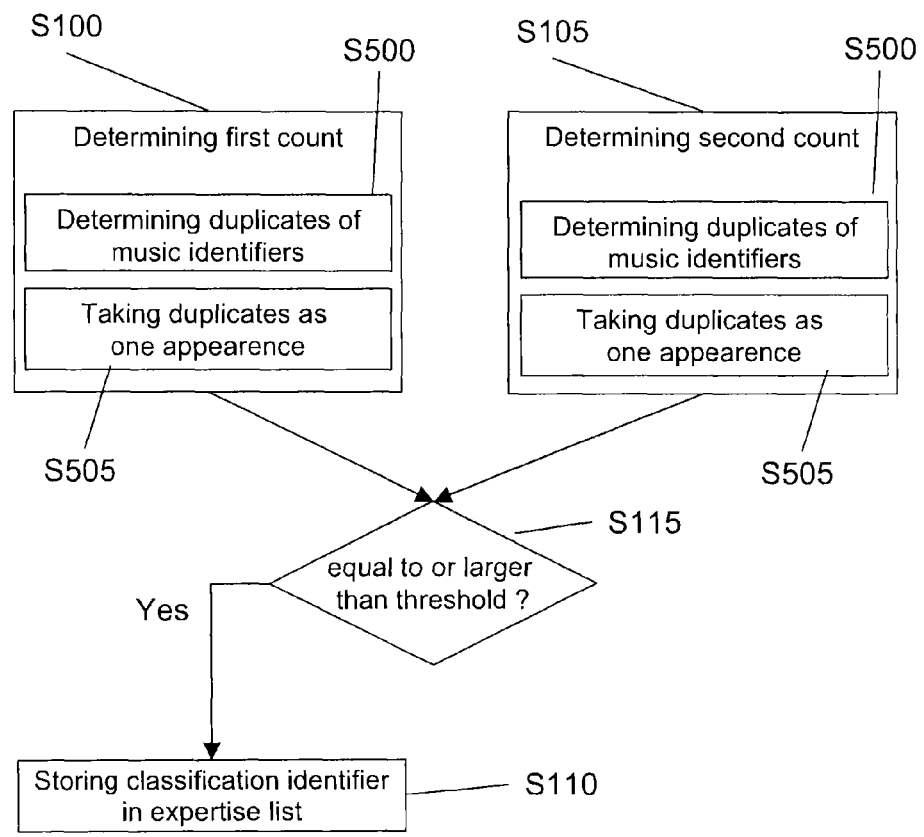
FIG. 6 illustrates a flow chart of another embodiment for generating a user music taste database including an expertise list.
Figure 7:
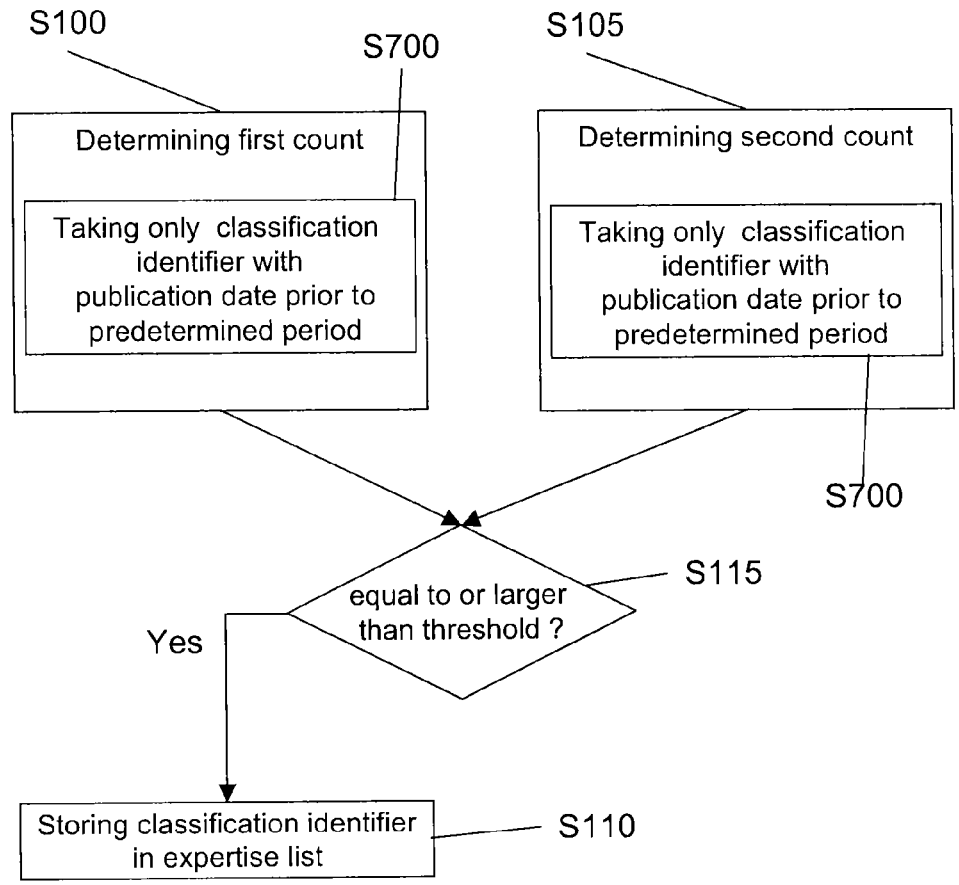
FIG. 7 illustrates a flow chart of another embodiment for generating a user music taste database including an expertise list.

FIGS. 5, 6, and 7 illustrate flow charts of other embodiments for generating a user music taste database including an expertise list.

According to the different embodiments, the determining of the first count S100 and second count S105 includes additional steps. It is noted that, even though the embodiments are described separately, they may be combined in any combination in further embodiments.

Further, steps S110 and S115 correspond to the ones as described referring to FIG. 1, and their description is omitted here.

In one embodiment, as illustrated in FIG. 5, determining the first count S100 includes detecting exact duplicates of music identifiers S500 in the first set of music identifiers and taking the exact duplicates as one appearance for determining the first count S505. In this embodiment the determining of the second count S105 corresponds to the one as described above referring to FIG. 1. Therefore, exact duplicates of the music identifiers may be disregarded in the method by counting them as one appearance.

A piece of music may exist in different versions that shall not be removed. However, the piece of music may exist, e.g. in a memory storing a plurality of pieces of music, as duplicates of the same version more than once. A reason for this may be that the piece of music is encoded using different encoders. In this case, the result that would be obtained by the counting of the appearance of each of the pieces of music separately may be improved by not counting these duplicates separately.

Another embodiment, as illustrated in FIG. 6, differs only from the embodiment that is described referring to FIG. 5 in that detecting exact duplicates of music identifiers S500 and taking the exact duplicates as one appearance for determining the first count S505 is also carried out for determining the second count S105.

In another embodiment, as illustrated in FIG. 7, for determining the first count S100 and/or for determining the second count S105 an appearance of the selected classification identifier is taken S700 as an appearance for increasing the count only if for the respective appearance the selected classification identifier is attributed to a music identifier being associated with a publication date prior to a predetermined time. The predetermined time defines a filter. Even though FIG. 7 shows that the taking as appearance S700 is carried out for both—for determining the first count S100 and for determining the second count S105—it may only be carried out in one of them.

Figure 8:
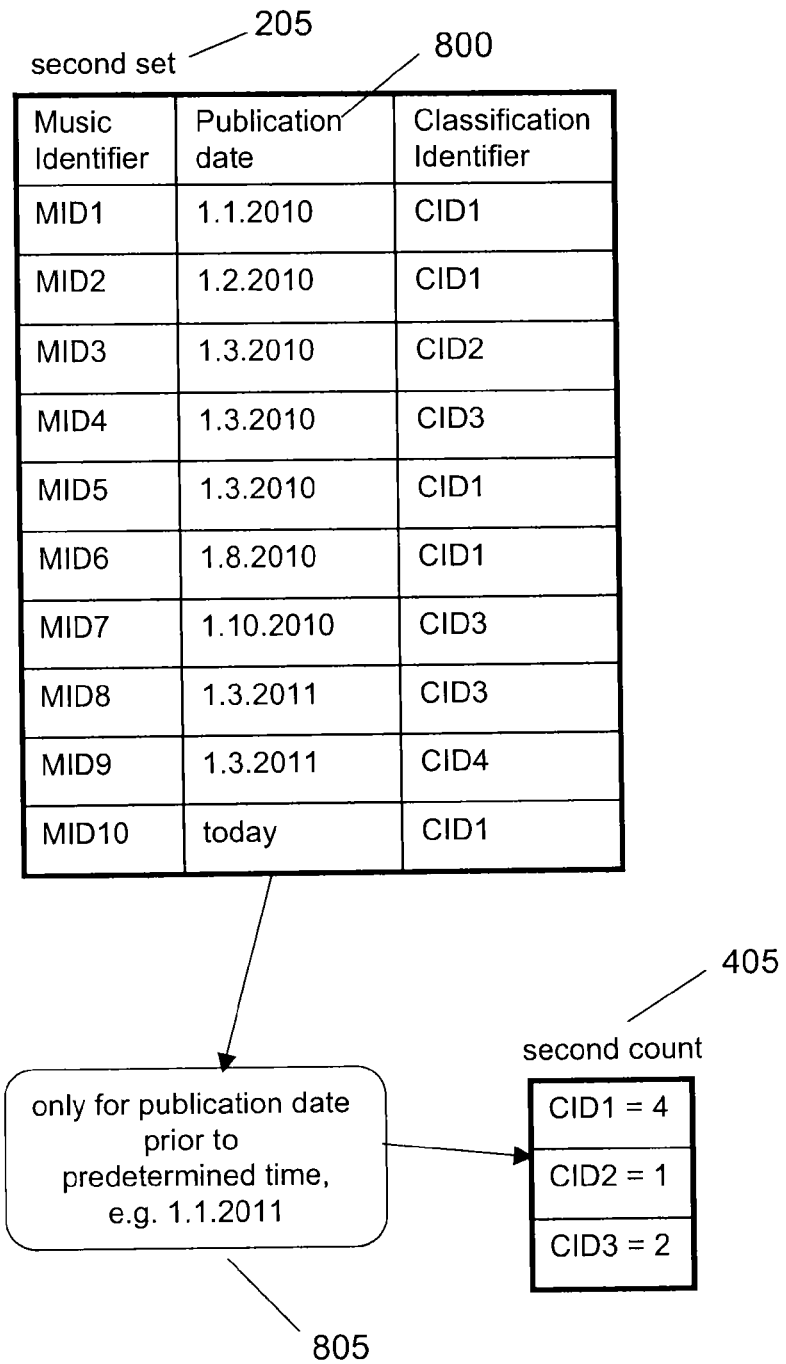
FIG. 8 is a chart schematically showing an example of the method according to the embodiment illustrated in FIG. 7 based on an arbitrarily selected second set of music identifiers for determining a second count taking the publication date into account.

As schematically shown in FIG. 8, in the second set 205 of music identifiers, publication dates 800 and classification identifiers may be attributed to the music identifiers and filtering by the publication date may result in a modification of the second count 405. In the example shown in FIG. 8 the filter 805 is set to 1.1.2011, and, accordingly the music identifiers MID8, MID9, and MID10 are not taken into account for determining the second count 405 of the number of appearances of a selected classification identifier.

Alternatively or additionally publication dates attributed to the music identifiers may be included in the first set of music and the publication dates in the first set of music may be used as described for the publication dates in the second set of music.

The publication dates 800 may be dates manually or automatically attributed to the music identifier. The publication dates may be set to a date represented by a time distance from a further predetermined time, e.g. the publication dates may be set to be always today or always 6 months before today. This may provide flexibility to the user or a provider of the first or the second set of music with respect to the individual pieces of music. By setting corresponding dates an output obtained when using the music taste database may be influenced. The publication dates 800 may be the date when the piece of music was available for the first time in a pieces of music database from which the second set 205 is deducted. In the user specific first set the publication dates 800 may refer to a first interaction date of the user with the corresponding piece of music. The publication dates 800 for different pieces of music in the same set may be determined differently.

The predetermined time and the further predetermined time may be dates and may identify one or more of hour, day, month or year. Further, the predetermined time and the further predetermined time may be a time period with respect to the date of carrying out the method. Such a time period may be 6 months before carrying out the method.

Additionally or alternatively, an appearance of a classification identifier for increasing the count may only be taken as an appearance if for the respective appearance the selected classification identifier is attributed to a music identifier associated with a publication date after another predetermined time. This may allow specifying time periods of interest. In other words, time periods of no interest may be disregarded.

For example, if an album that is younger than 6 months is to be disregarded when determining the first and second count, this may be achieved by setting a corresponding filter for the publication dates, and pieces of music that are included in this album and have the same publication date as the album may accordingly be disregarded.

Figure 9:
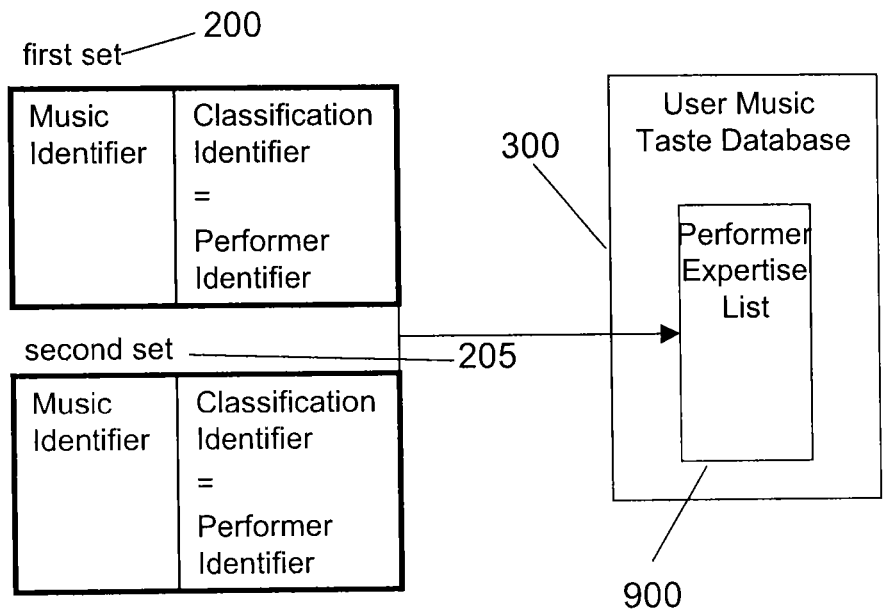
FIG. 9 illustrates performer identifiers as classification identifiers.

In one embodiment the classification identifier may be a performer identifier. Thus, in the first set 200 and in the second set 205 performer identifiers are attributed to the music identifiers and the expertise list may be a performer expertise list. The expertise level threshold value may accordingly be denoted as "BandExpertLevel". FIG. 9 schematically illustrates a performer expertise list 900 generated from the corresponding first set 200 and the corresponding second set 205.

Figure 10:
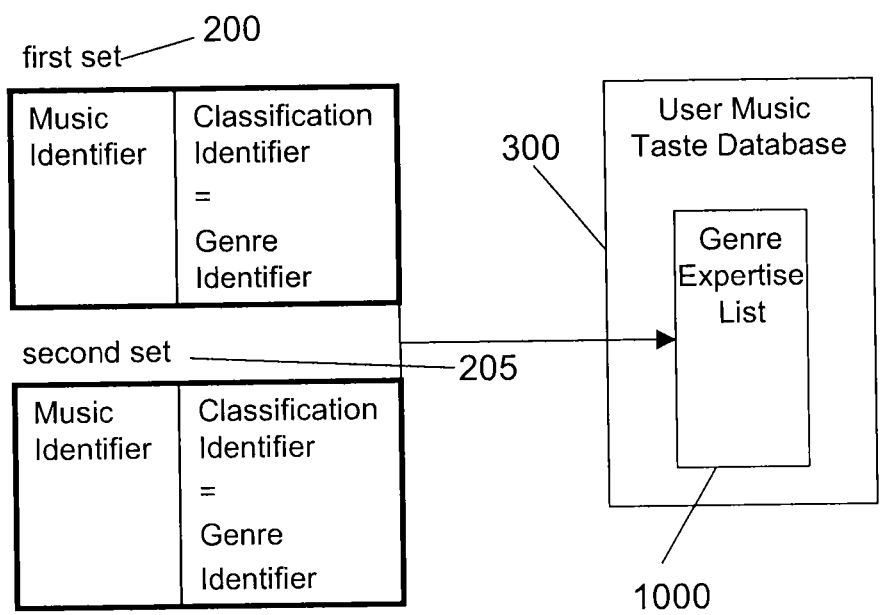
FIG. 10 illustrates genre identifiers as classification identifiers.

In another embodiment the classification identifier may be a genre identifier. Thus, in the first set 200 and in the second set 205 genre identifiers are attributed to the music identifiers and the expertise list may be a genre expertise list. The expertise level threshold value may accordingly be denoted as "GenreExpertLevel". FIG. 10 schematically illustrates a genre expertise list 1000 generated from the corresponding first set 200 and the corresponding second set 205.

The embodiments of the method described above referring to the classification identifier may be carried out accordingly by using the performer identifiers and/or the genre identifiers.

Embodiments for which the classification identifier refers to a performer identifier and for which the classification identifier refers to a genre identifier may be carried out in combination, and the storing S110 may be a storing of the expertise lists in one common expertise list or in separate expertise lists in the user music taste database.

Figure 11:
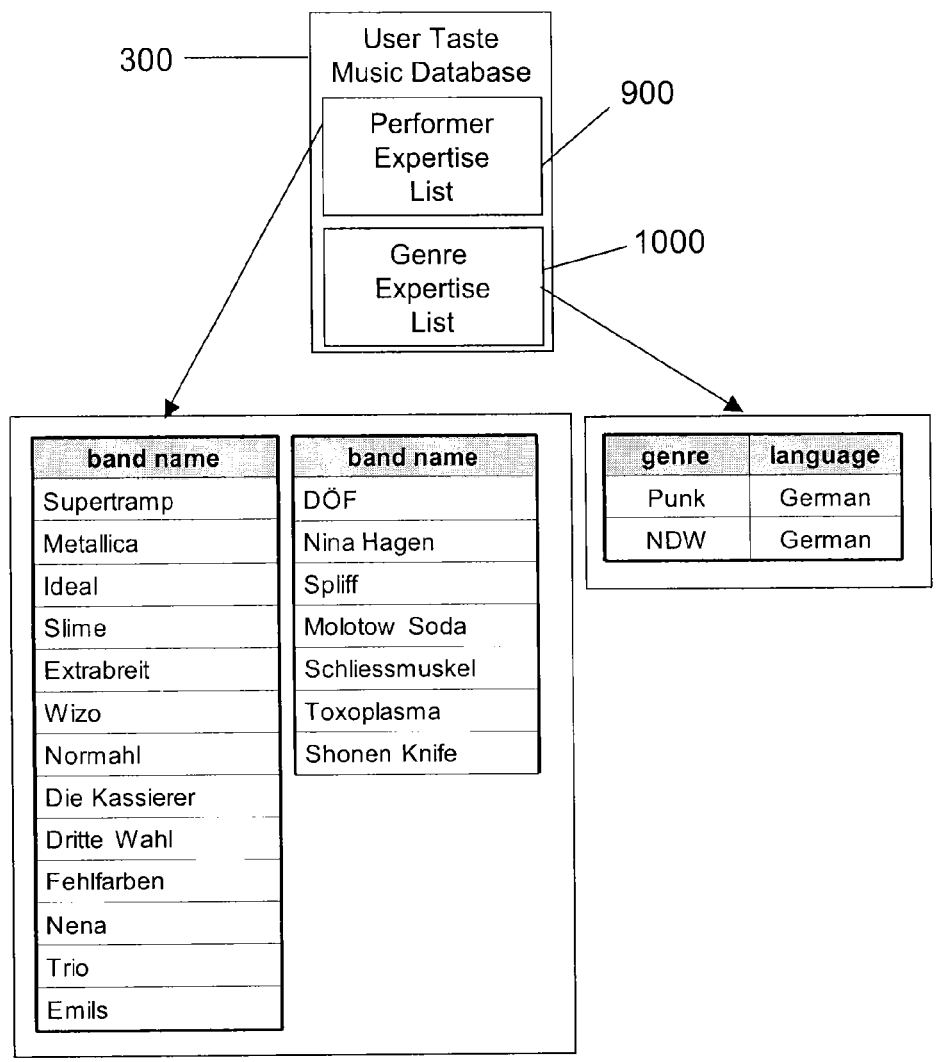
FIG. 11 illustrates the performer expertise list and the genre expertise list for arbitrarily selected identifiers.

As schematically illustrated in FIG. 11, the performer expertise list 900 and the genre expertise list 1000 may both be stored together in the user music taste database.

As FIG. 11 illustrates, the genre expertise list 1000 may distinguish between languages. A language may be attributed to at least one music identifier or each music identifier of the first set of music identifiers and of the second set of music identifiers. The language may be attributed to each music identifier similar to the publication dates 800 in FIG. 8. Alternatively, the language may be attributed to the music identifier by encoding the information already in the music identifier. Then, the method as described in FIG. 1 may be carried out by counting appearances of music identifiers to which a same language is attributed, and, in the genre expertise list, the language may be included in association with the genre identifier. As an example, in FIG. 11 the expertise for different band names is listed and the expertise of the genre "Punk" and "NDW" both in German is listed. By filtering the music identifiers according to their attributed language only music that is attributed to this language is taken into account when determining the first and second count. Accordingly, the expertise list may reflect the user's expertise for pieces of music of that language. In other words, for determining the first count and for determining the second count only appearances of the selected genre identifier attributed to music identifiers to which a same language is attributed is taken as appearance. Further, the same language may be included in the expertise list attributed to the genre identifier.

Alternatively or additionally to the attribution of a language to the music identifiers a language may be attributed to performer identifiers. Accordingly, the method as described in FIG. 1 may be carried out by counting appearances of performer identifiers to which a same language is attributed, and, in the genre expertise list, the language may be included in association with the genre identifier.

Further, the genre identifier may include additional information such as language or origin. For example a genre identifier may be "English Pop", "Britpop", "Neue deutsche Welle", "US Rock" and alike. Thus, by including such additional information in the genre identifier, more granular identifiers may be used.

Figure 12:
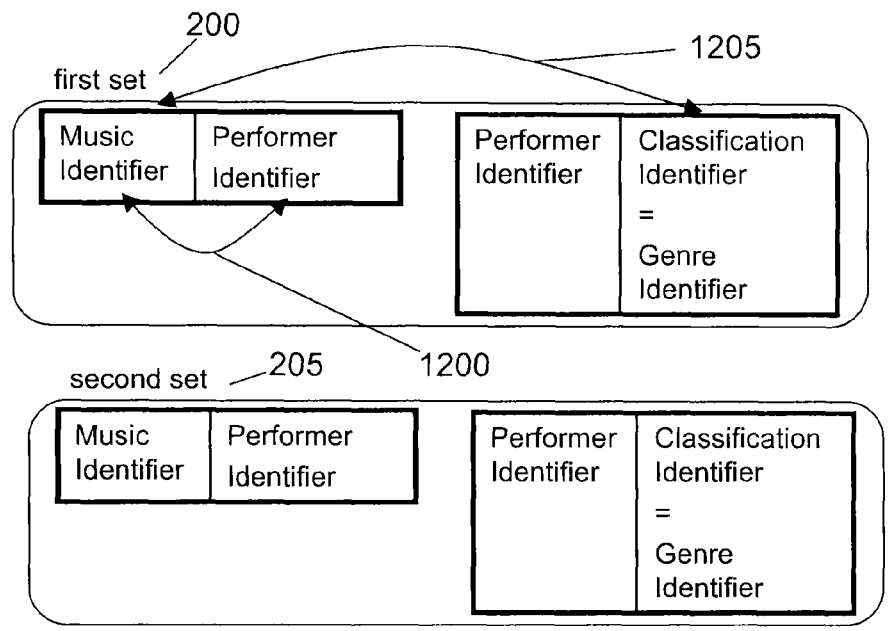
FIG. 12 illustrates an embodiment of attributing the genre identifiers to music identifiers in the first set and the second set of music identifiers.

The expression "attributed" is used throughout the description as representing a link between data attributed to each other in the data structure. As illustrated in FIG. 12, the link may be a direct link 1200 or an indirect link 1205. In the example illustrated in FIG. 12 the music identifier is directly linked to the performer identifier and the music identifier is indirectly linked to the genre identifier via the performer identifier. For example, the data structure may provide a first list, in which the music identifiers are included together with the performer identifiers, i.e. directly linked and a second list, in which the performer identifiers are included together with the genre identifiers, i.e. the music identifiers are indirectly linked to the genre identifiers. For determining a genre identifier that is attributed in to the music identifier, the performer identifier may be determined from the first list based on the music identifier and then the genre identifier may be determined based on the performer identifier from the second list. In this data structure there may exist no list directly attributing the genre identifier to the music identifier. In such a data structure the list attributing the genre identifier to the performer identifier may be prepared separately and independently from the music identifiers and also the relevant storage space for saving the information may be reduced. In another data structure the genre identifiers may be stored in a list together with the music identifiers. In this other data structure the time necessary for determining the count may be reduced.

Further, in such other data structure music identifiers attributed to the same performer identifier may be attributed to different genre identifiers. The data structures may be different in different databases or sets of music identifiers and may be present in combination.

Further, as illustrated in FIG. 12, the music identifiers of the first set 200 of music identifiers may be attributed to genre identifiers and the music identifiers in the second set 205 of music identifiers may be attributed to genre identifiers, wherein the genre identifiers attributed in the first set 200 may be different to the genre identifiers in the second set 205.

Figure 13:
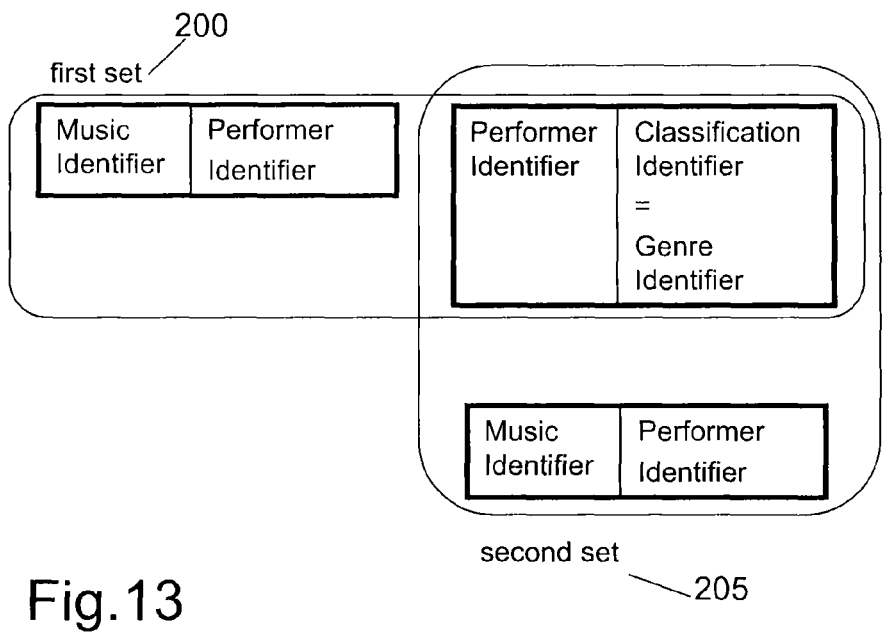
FIG. 13 illustrates another embodiment of attributing the genre identifiers to music identifiers in the first set and the second set of music identifiers.

Alternatively, as illustrated in FIG. 13, the music identifiers of the first set 200 of music identifiers and the music identifiers in the second set 205 of music identifiers may be attributed to the same genre identifiers.

Figure 14A:
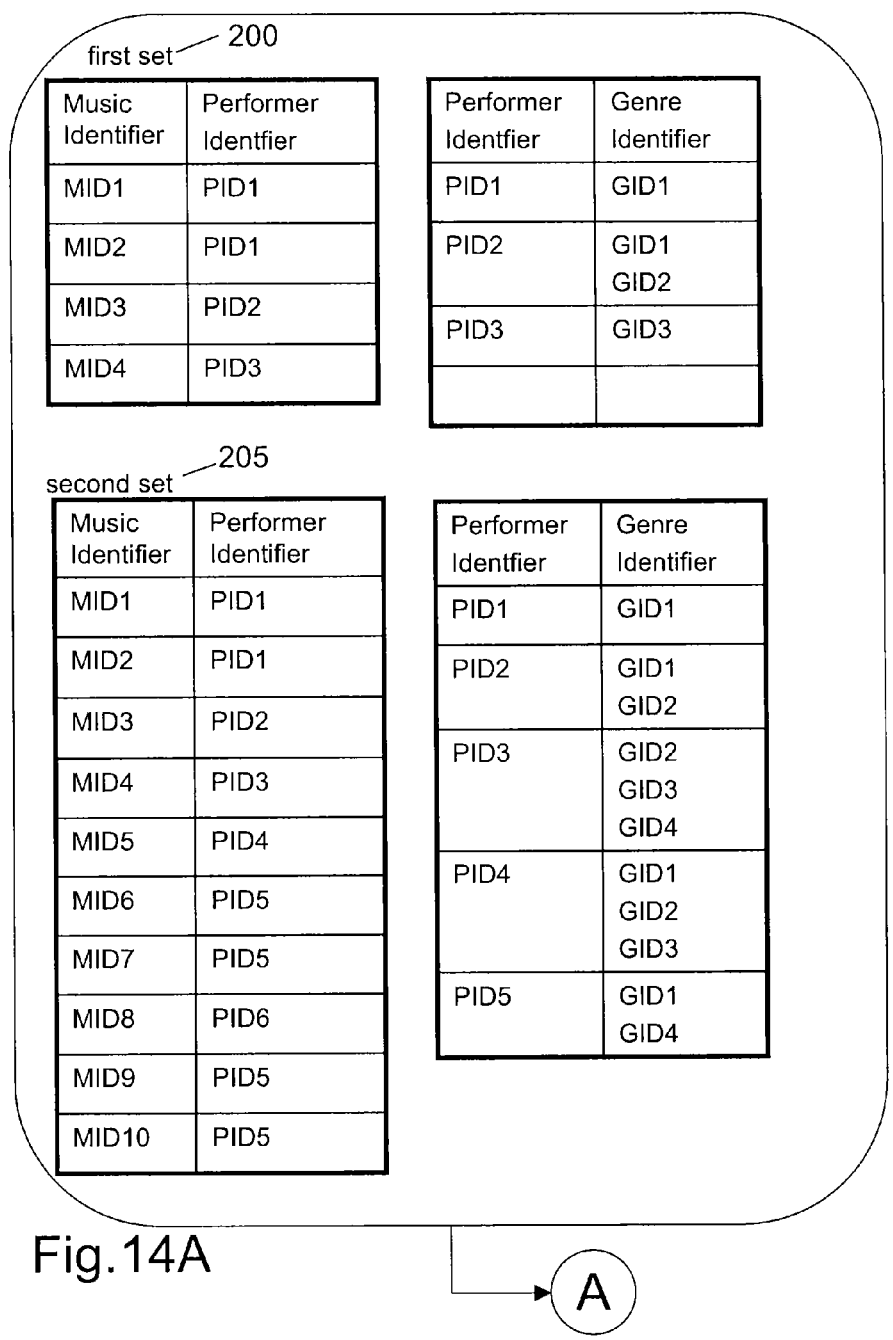
FIGS. 14A and 14B are charts schematically showing in combination an example of the method according to the embodiment illustrated in FIG. 1 based on a first and second set of music identifiers corresponding to the ones illustrated in FIG. 12.

Further, as illustrated in FIG. 14A, there may be more than one genre identifier attributed to a performer identifier. In FIG. 14A, e.g. GID1 and GID2 are attributed to PID2. This may be the case if a performer represented by a performer identifier is considered to be a representative of more than one genre.

Figure 14B:
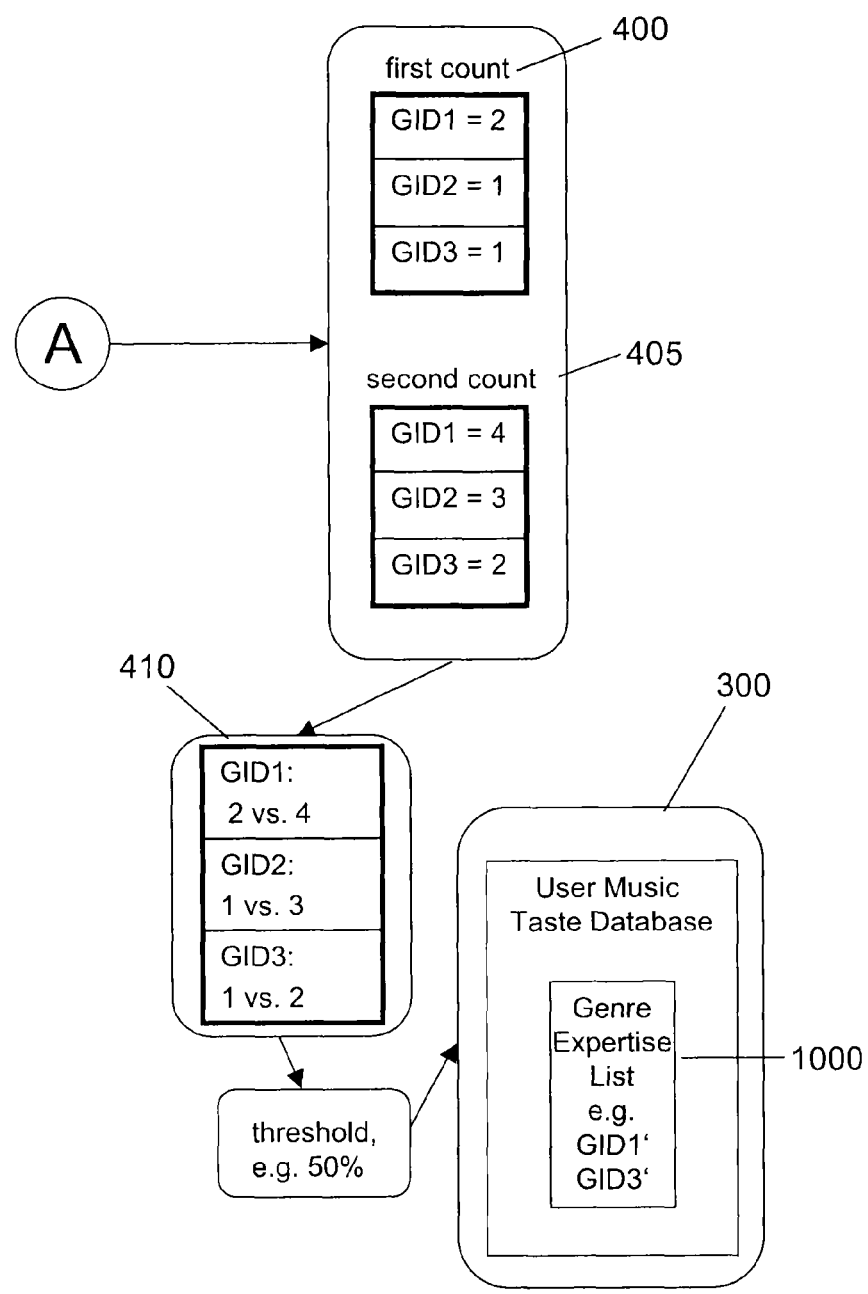

As illustrated in FIGS. 14A and 14B the method as described referring to FIG. 1 may be carried out based on the first set 200 and the second set 205 as described when referring to FIG. 12. FIGS. 14A and 14B show in a chart the result of carrying out the method as described referring to FIG. 1 for three selected genre identifiers GID1, GID2, GID3. It is noted that the method may be carried out independently for each of the genre identifiers GID1, GID2, GID3. The first count 400 is determined from first set 200 and the second count 405 is determined from second set 205. As illustrated, the multiple attribution of genre identifiers influences the first count 400 and the second count 405. Further, as illustrated in FIG. 14B the number of appearances of the same genre identifier may differ in the first set 200 and the second set 205. This causes that the first count vs. the second count 410 differs for the different classification identifiers GID1, GID2, GID3, and by comparing the relative value 410 with the expertise level threshold value 415 for a genre and determining the values 410 which are equal or larger than the expertise level threshold value 415 only the corresponding genre identifier is stored in the expertise list 305 in the user music taste database 300. In the example in FIGS. 14A and 14B the 50% threshold is reached or exceeded by GD1 and GD3, thus the related genre identifiers GD1' and GD3' are stored in the genre expertise list 1000.

Another embodiment of the method only differs from the one described referring to FIGS. 14A and 14B in that instead of using the first set 200 and the second set 205 as described referring to FIG. 12 the first set 200 and the second set 205 as described referring to FIG. 13 is used, i.e. the same attribution of performer identifiers to genre identifiers is used.

A user may be an expert for a band represented in the database by a performer identifier as a classification identifier if the user is assumed to know equal to or more than a threshold value of pieces of music of this band, and a user may be an expert for a genre represented in the database by a genre identifier as a classification identifier if the user knows equal to or more than a threshold value of bands represented by the performer identifier attributed to this genre.

Thus, if performer identifiers, e.g. band names, vary even though the same performer (band) is meant, the quality of the performer and the genre expertise list may be improved by taking this into account. Such variations may be caused by the way the band name is written, lower and upper case notations, changes in band name over time, and alike.

Figure 15:
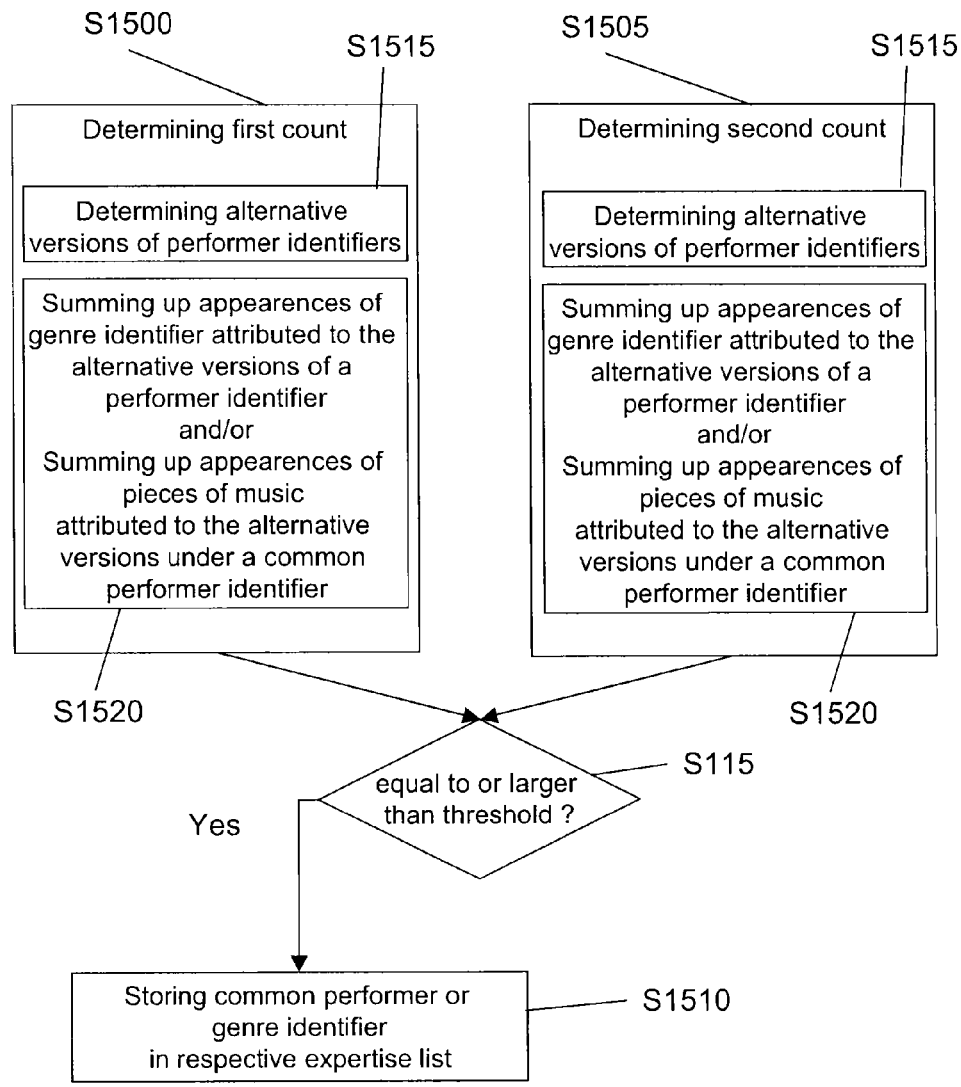
FIG. 15 illustrates a flow chart of another embodiment for generating a user music taste database including an expertise list for performer identifier or genre identifier.

For overcoming this problem, in one embodiment the method as described when referring to FIG. 1 is modified. This is illustrated in FIG. 15. The modified embodiment of the method may be used for both a performer identifier expertise list and a genre identifier expertise list.

A determining of first count S1500 corresponds to the determining of first count S100, wherein the classification identifier is a performer identifier or a genre identifier. A determining of second count S1505 corresponds to the determining of second count S105, wherein the classification identifier is a performer identifier or a genre identifier. Additionally, the determining of first count S1500 and the determining of second count S1500 includes determining alternative versions of performer identifiers S1515. For identifying a genre identifier for storing in the genre expertise list, the appearances of the genre identifier attributed to the variations of a performer identifier attributed in the first and second set of music identifiers, respectively are summed up S1520, optionally taking alternative versions of a piece of music as one appearance. For identifying a common performer identifier for storing in the performer expertise list, the appearances of pieces of music attributed to the variations of a performer identifier attributed in the first and second set of music identifiers, respectively are summed up, optionally taking alternative versions of a piece of music as one appearance, under a common performer identifier S1520.

Figure 16:
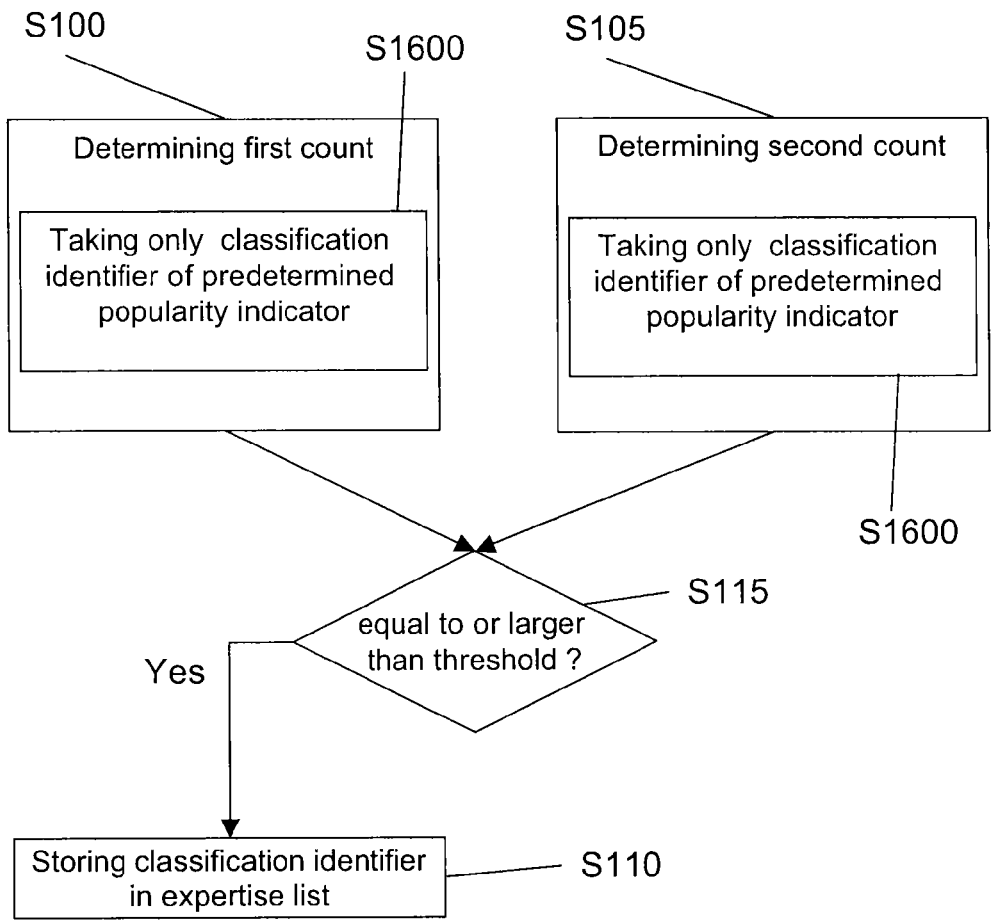
FIG. 16 illustrates a flow chart of another embodiment for generating a user music taste database including an expertise list.
Figure 17A:
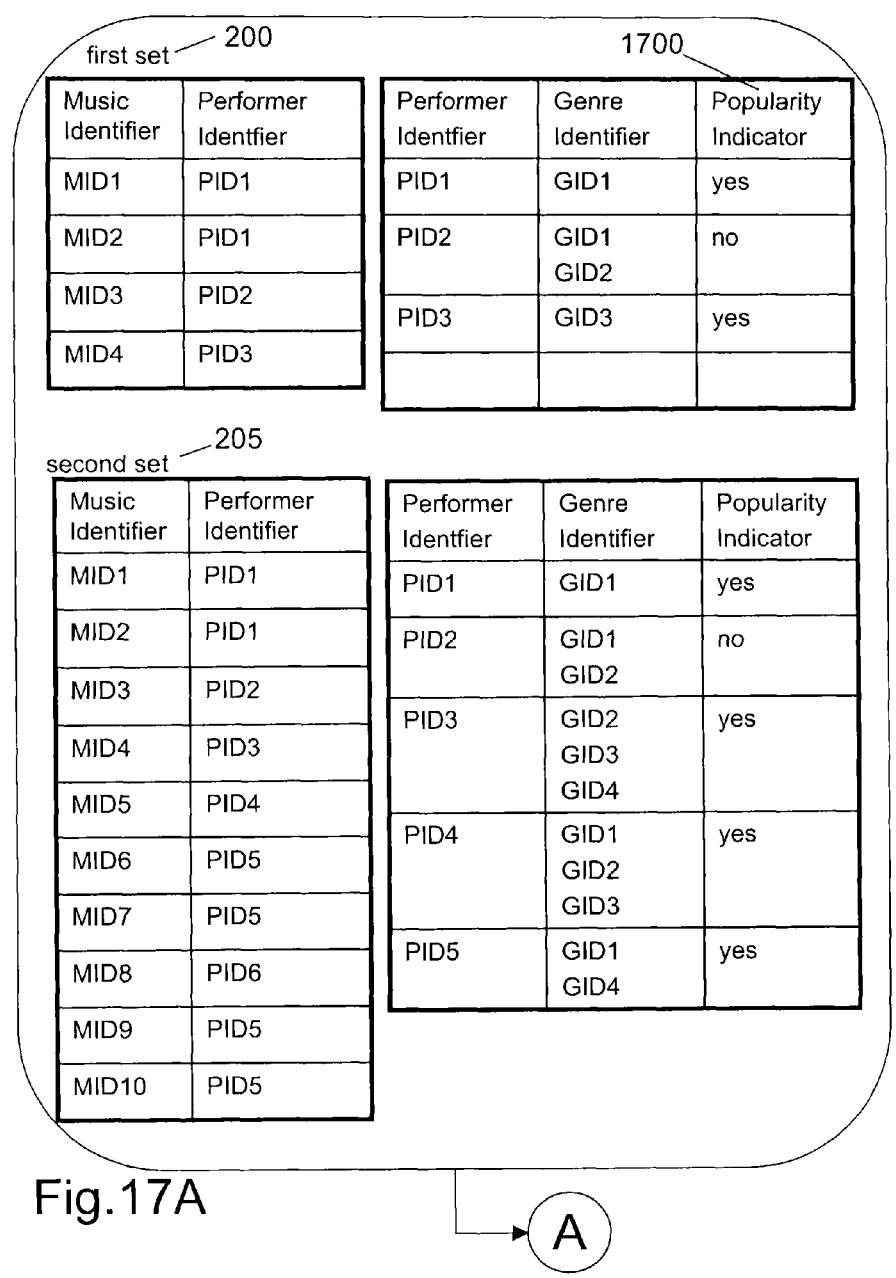
FIGS. 17A and 17B are charts schematically showing in combination an example of the method according to the embodiment illustrated in FIG. 16 based on a first set and a second set of music identifiers with attributed popularity indicators.
Figure 17B:
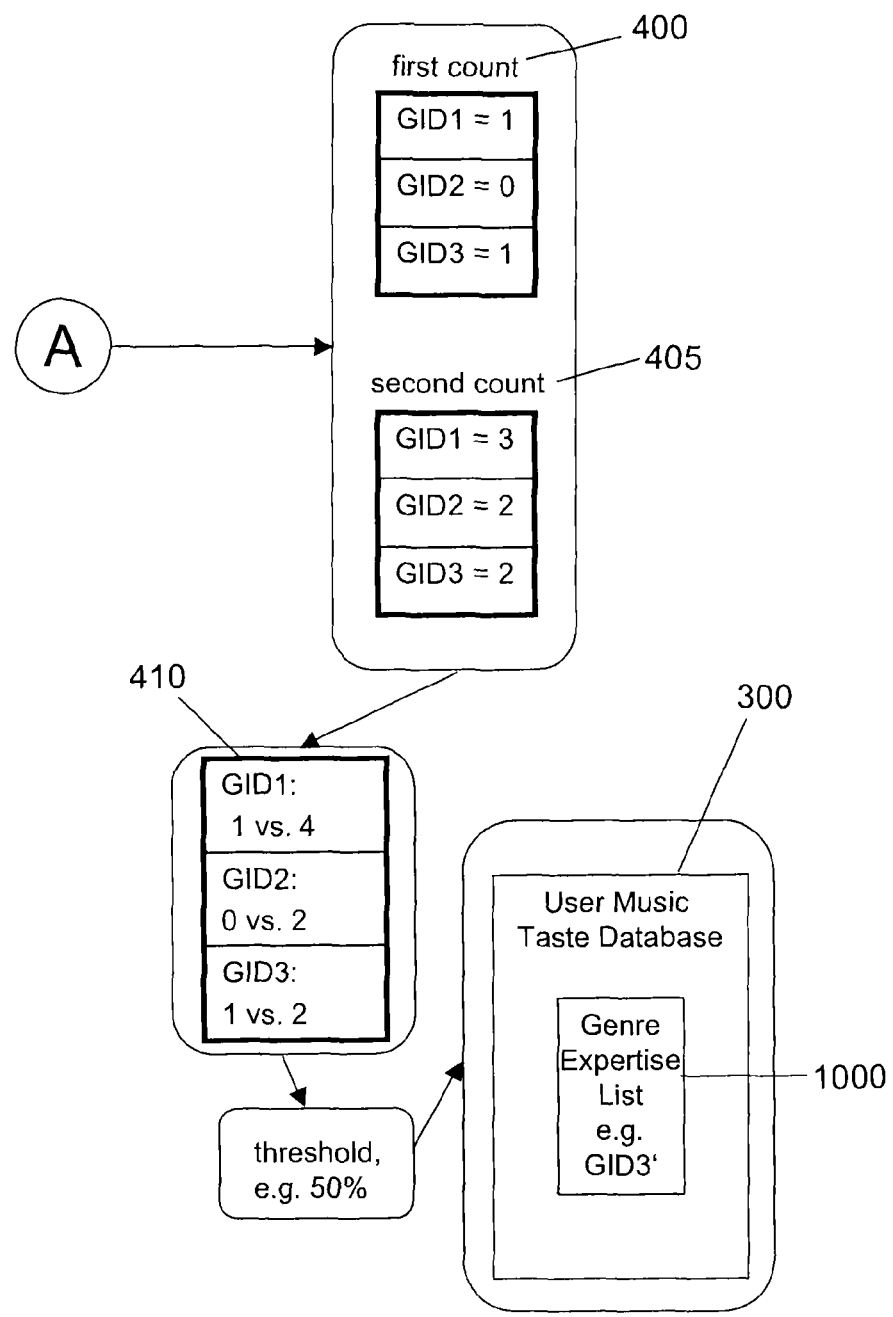

In a further embodiment that may be combined with the embodiments above, determining the first count S100 and second count 105, see FIG. 1, of the appearance of genre identifiers as classification identifiers may be modified by only taking into account popular bands. Such an embodiment of the method is illustrated in FIG. 16 in combination with FIGS. 17A and 17B. As illustrated in FIG. 17A popularity indicators 1700 "yes"/"no" are attributed to the performer identifiers PID1, PID2, PID3, PID4, PID5 in the first set 200 and in the second set 205. The determining of the first count S100 and determining of the second count S105 takes only appearances of the selected genre identifier attributed to a performer identifier that is attributed to a predetermined popularity indicator of the popularity indicators as appearances S1600, as illustrated in FIG. 16. In the example illustrated in FIGS. 17A and 17B, only performer identifiers with a popularity indicator 1700 set to "yes" are taken and the first count 400 and the second count 405 are determined accordingly. For example, GID2 may be 0 instead of 2, if no popularity indicator 1700 is taken into account, and with a threshold value of 50% only GID3' is stored in the expertise list. Taking the popularity indicator into account may allow determining an expertise level based on the popular bands only and, therefore, completely unknown bands of the respective genre do not change the counts. Thus, a user may be determined to be an expert if he knows enough popular performers in this genre but does not know any unpopular bands, e.g. because they are only locally known.

Figure 18:
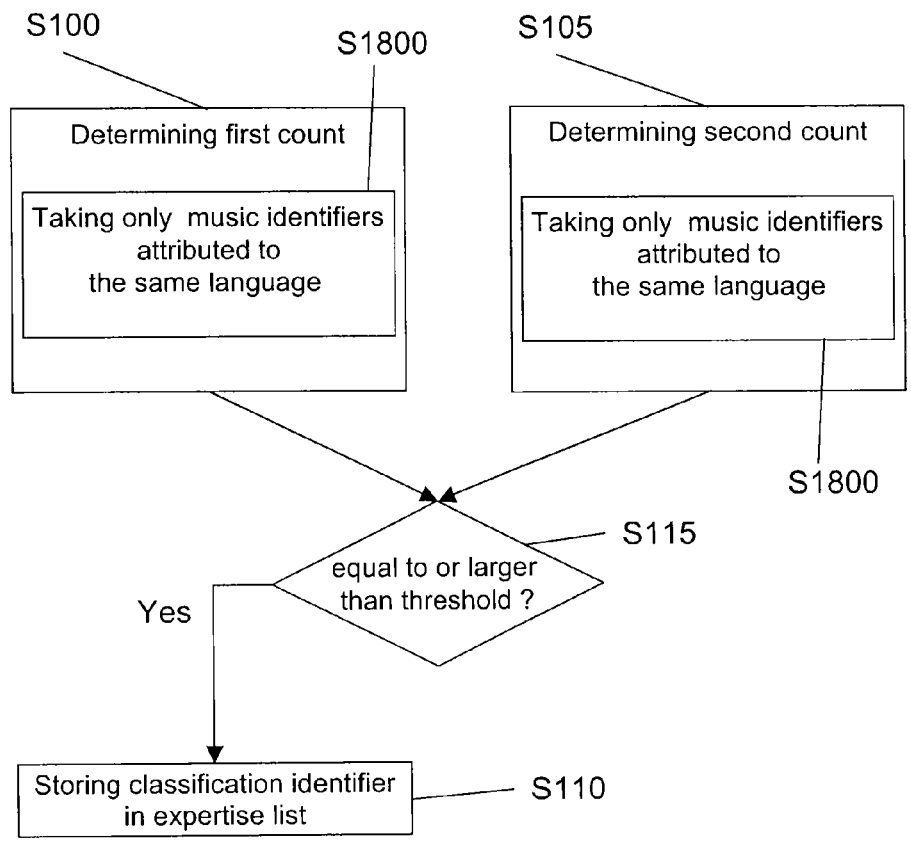
FIG. 18 illustrates a flow chart of another embodiment for generating a user music taste database including an expertise list taking the language into account.

Further, determining the first count S100 and second count 105, see FIG. 1, of the appearance of genre identifiers as classification identifiers may be conducted by taking into account the language attributed to the music identifier. Such an embodiment of the method is illustrated in FIG. 18. According to the embodiment one language is attributed to each music identifier of the first set of music identifiers and of the second set of music identifiers. The determining of the first count S100 and determining of the second count S105 takes only appearances of the selected genre identifier attributed to music identifiers to which a selected same language is attributed as appearances S1600. Storing of the classification identifier, here genre identifier, S110 may include storing the selected language in association with the genre identifier.

Figure 19:
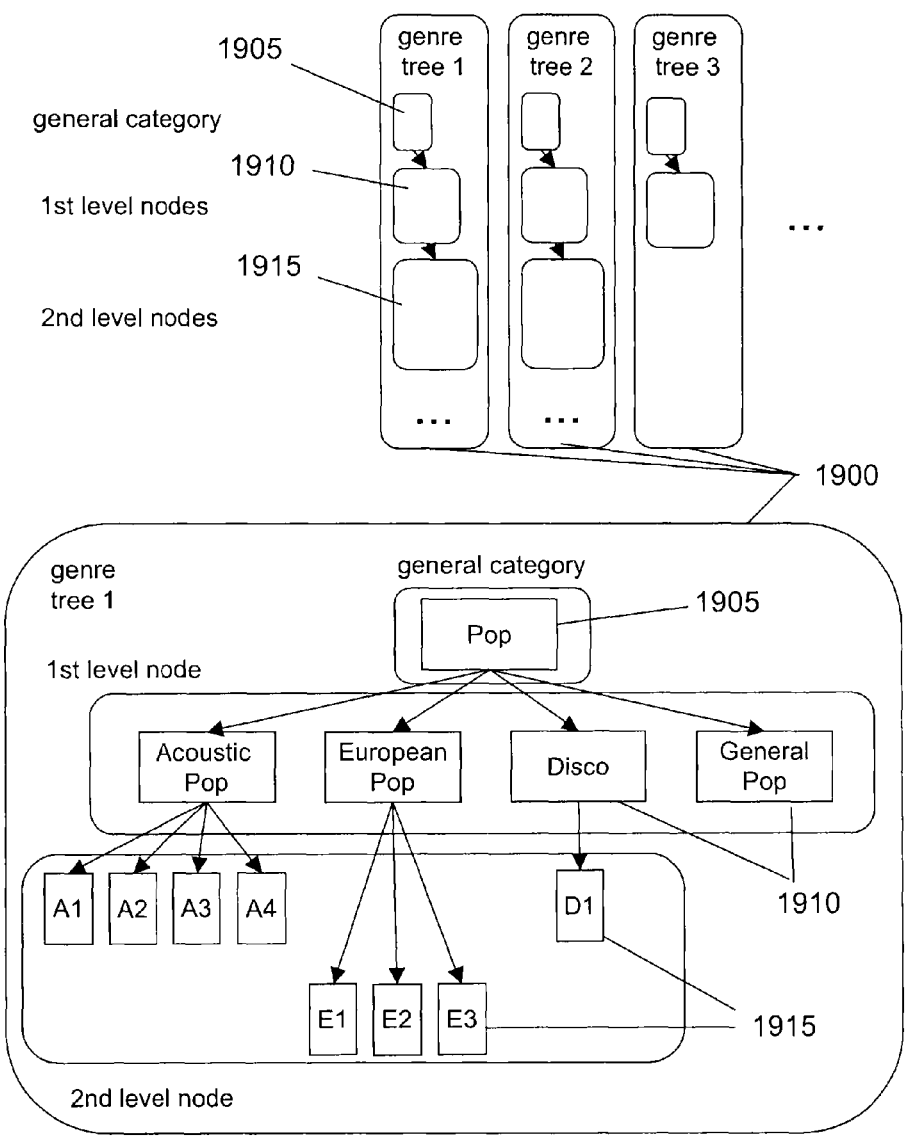
FIG. 19 illustrates the tree data structure of the genre identifiers.

As described when referring to FIG. 1, a classification identifier related to the selected classification identifier in an expertise list is stored in the user music taste database S110. The classification identifier that is stored may be the same as the selected classification identifier or may be a different classification identifier. In FIG. 19 a relation is illustrated. The genre identifiers may have a genre tree structure 1900. There may exist a plurality of genre tree structures 1900, each for a different language. There may exist different levels of nodes, such as general node 1905, $1^{st}$ level nodes 1910 and $2^{nd}$ level nodes 1915. Further levels may be present. The $1^{st}$ level nodes 1910 and $2^{nd}$ level nodes 1915 and the further levels are higher-level than the general category 1905, and the larger the number of the levels in-between a specific level and the general category 1905 is, the higher is the level. The genre identifier stored in the expertise list S110 may be a genre identifier corresponding to a node of a lower level with respect to the node of the selected genre identifier.

There may exist different genre tree structures 1900 for different genres. As illustrated in FIG. 19, for example the general category 1905 may be "POP", the $1^{st}$ level nodes may be "Acoustic Pop", "European Pop", "Disco", "General Pop". Each of these sub-genres of the $1^{st}$ level nodes, which are children nodes of the general category, may have the same or different numbers of children nodes, e.g. A1 to A4, which are then positioned in the $2^{nd}$ level 1915.

Figure 20:
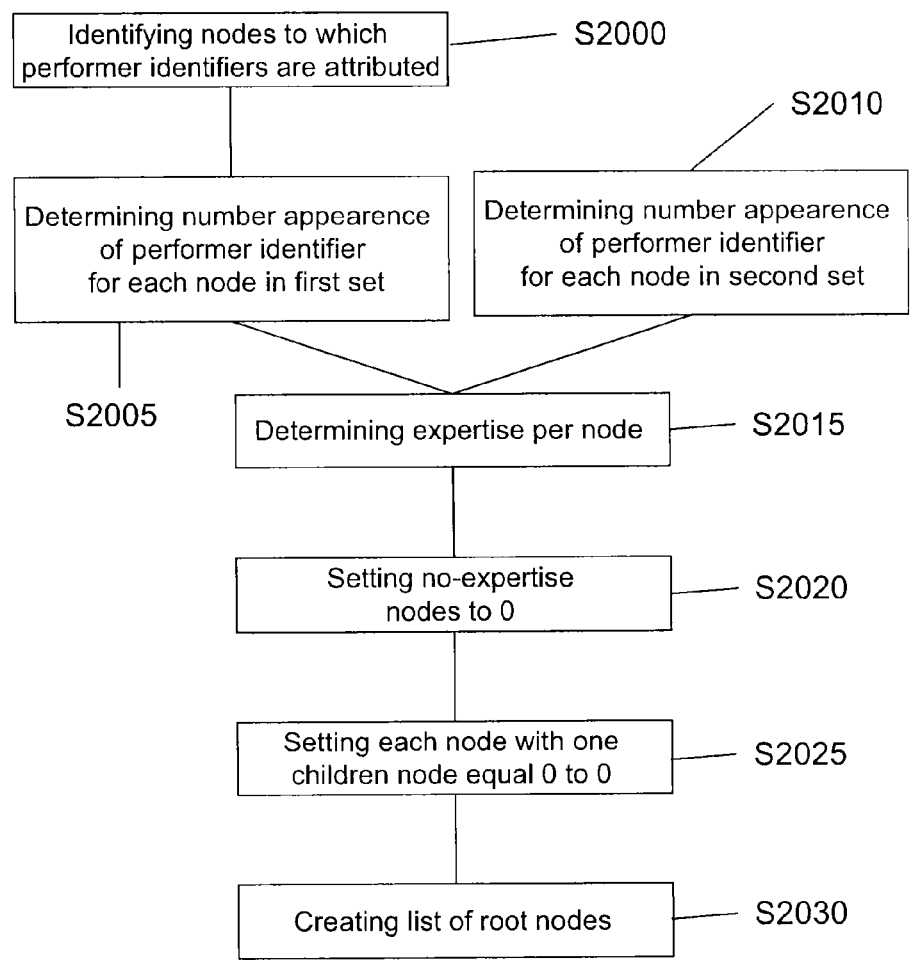
FIG. 20 illustrates a flow chart of another embodiment, based on the embodiment of FIG. 1, for generating a user music taste database including an expertise list for a genre tree data structure.
Figure 21:
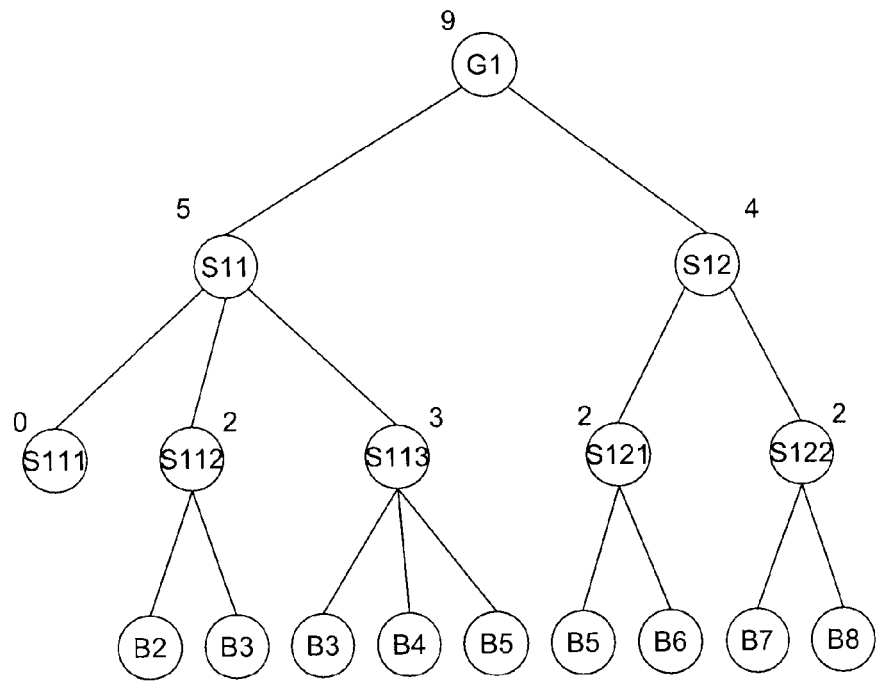
FIGS. 21 and 22 are charts illustrating exemplary genre trees obtainable by the method according to FIG. 20.
Figure 22:
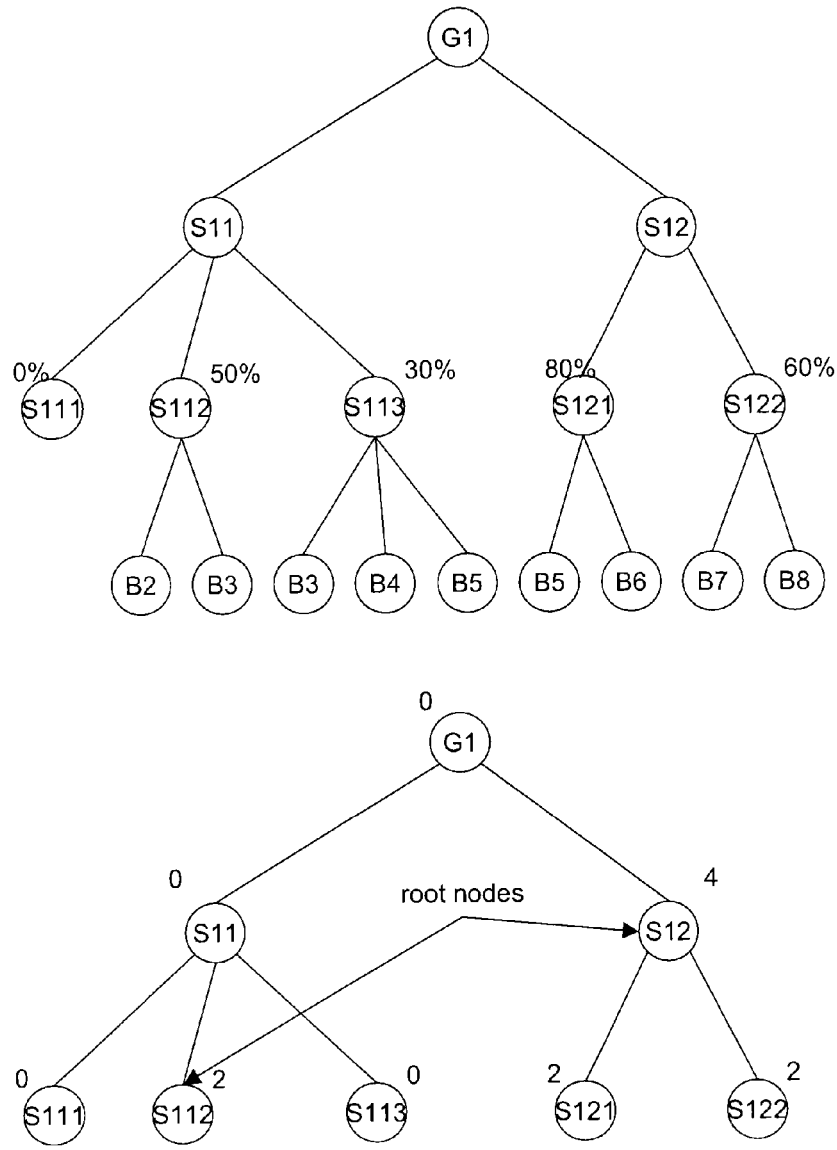

As illustrated in FIGS. 20 to 22, in one embodiment of the method using the tree structure as illustrated in FIG. 19, a genre identifier may be stored in the genre expertise list. The method is an embodiment of the method as described when referring to FIG. 1. The method comprises identifying S2000 the corresponding genre identifiers (nodes) S112, S113, S121, S122 in a genre tree—multiple genre identifiers per song may exist and the genre tree may be specific for a language—to which performer identifiers B2, B3, B4, B5, B6, B7, B8 are attributed in the first set of music identifiers, summing S2005 the number of performer identifiers B2, B3, B4, B5, B6, B7, B8, i.e. the number of appearances of performer identifiers, attributed to this genre identifier at the corresponding node S111, S112, S113, S121, S122, i.e. determining the first count per node and at every parental node S11, S12, G1 (e.g. in Acoustic Pop, and therefore also in Pop in FIG. 19). Exemplary numbers of appearances are shown as numbers next to the nodes S111, S112, S113, S121, S122, S11, S12, G1 in FIG. 21. The number of performer identifiers attributed to the genre identifier at the corresponding node in the tree may be stored. Further, the method comprises determining S2010 the numbers for the highest level nodes S111, S112, S113, S121, S122 in a corresponding manner from a second set of music identifiers, i.e. determining the second count per node, and determining S2015 the expertise level per highest level nodes S111, S112, S113, S121, S122 by determining if a value determined from setting the first count and the second count in relation to each other is equal to or larger than a predetermined expertise level threshold value S115 for each node. For example in FIG. 22 an expertise level for S113 is determined to be 30%, and an expertise level for S121 is 80%. If the expertise level is not reaching the threshold value, the number at the corresponding node is set to 0 S2020. For example in FIG. 22 a threshold value is set to 50% and, therefore the number at for S113 is set to 0. Further, the embodiment of the method comprises setting S2025 the number of performer identifiers in all parental nodes to 0 that have at least one children node with a number of performer identifiers equal to 0—it is noted that accordingly a number of 0 in the highest level node is forwarded to every parent node in a row, e.g. FIG. 22 illustrates that the 0 at S111 is forwarded to S11 and G1. Only the genre identifiers of root nodes are stored in the expertise list S2030, wherein the root nodes are the lowest-level nodes with a number of performer identifiers larger than 0. There may exist one or more root nodes and the root nodes may be located at every level of the genre tree structure. As illustrated in FIG. 22 the numbers at S12, S121 and S122 are larger than 0. S12 is the lowest-level node, therefore only the genre identifier of S12 is stored with respect to the branches formed by S12, S121 and S122. There may as well be more than one genre identifier be stored. As illustrated in FIG. 22 the number at S11 is 0 and the number at S112 is 2. S112 is therefore a root node and may be stored.

Figure 23:
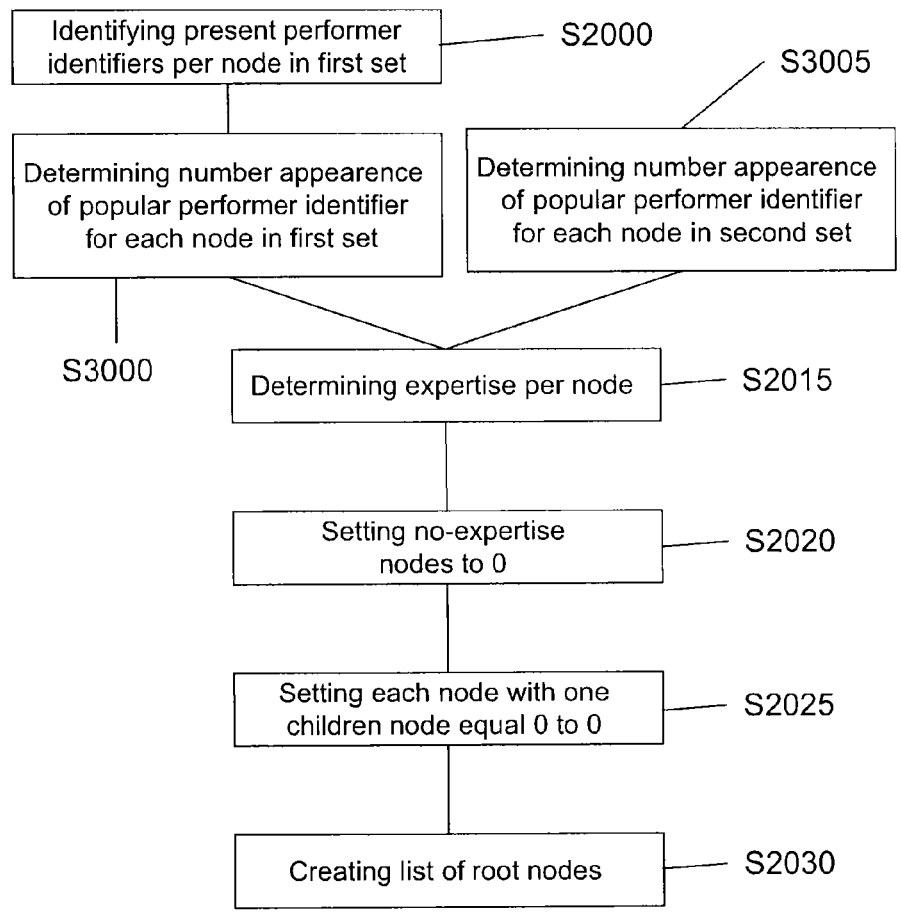
FIG. 23 illustrates a flow chart of another embodiment, based on the embodiment of FIG. 1, for generating a user music taste database including an expertise list for a genre tree data structure taking into account a popularity indicator.
Figure 24:
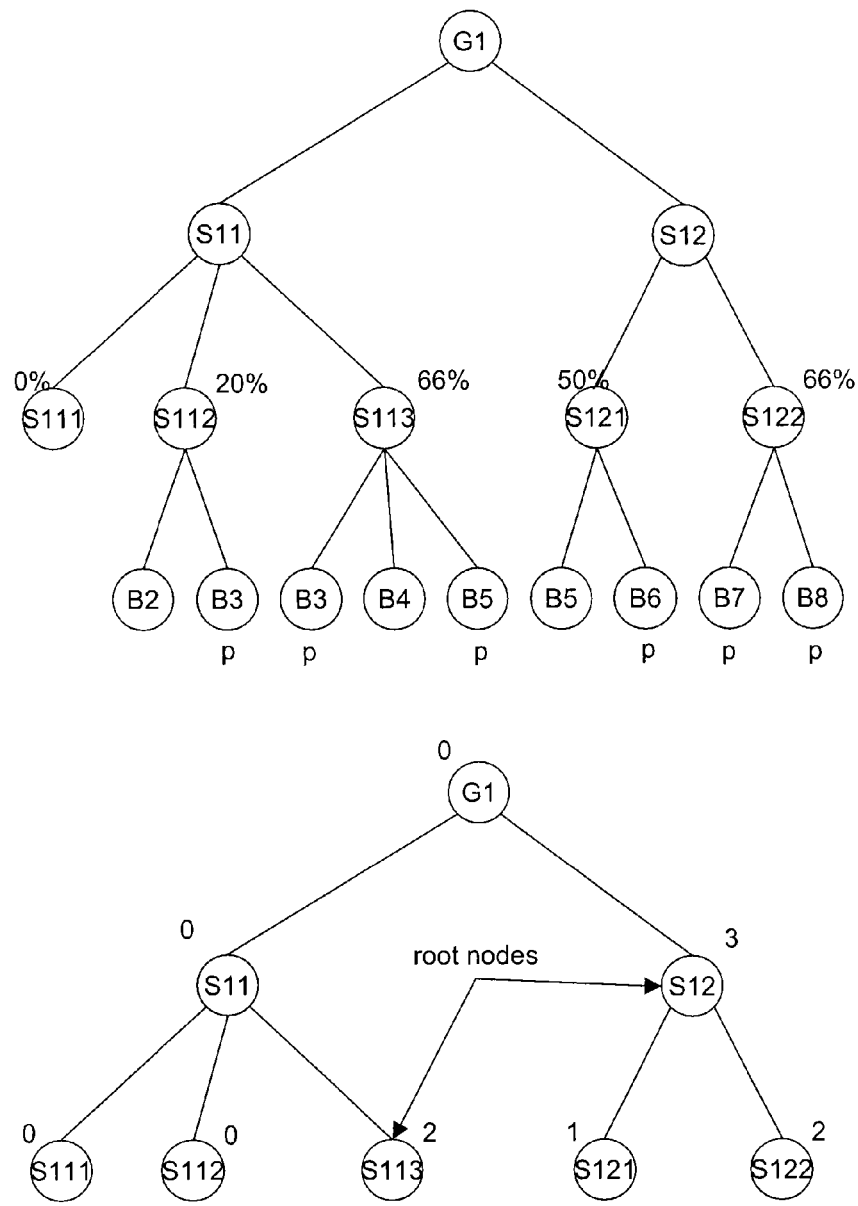
FIG. 24 is a chart illustrating exemplary genre trees obtainable by the method according to FIG. 23.

A further embodiment is illustrated in FIGS. 23 and 24. The steps S200, S2015, S2020, S2025, and S2030 correspond to the ones as described above when referring to FIGS. 20 to 22 and their description is not repeated here. The method includes determining popular bands S2300. "Popular band" has the meaning that the performer identifier is attributed to a positive popularity indicator 1700 as described when referring to FIGS. 16 and 17. Further, the embodiment includes summing S3000 the number of appearances of performer identifiers which denote "popular bands" B3, B5, B6, B7, B8 attributed to a same genre identifier at the corresponding node S111, S112, S113, S121, S122 and at every parental node S11, S12, G1. The "popular bands" are the ones attributed to a positive popularity indictor. In other words determining the first count per node. Further, the method of this embodiment includes determining S3005 correspondingly the numbers for the highest level nodes S111, S112, S113, S121, S122 and every parental node S11, S12, G1 from a second set of music identifiers. In other words determining the second count per node, taking into account only the "popular bands" for each node in second set.

In FIG. 24 it is illustrated that for example the expertise level at S112 is 20% and at S121 is 50%. Thus, with a threshold value of 50% the number at S112 is set to 0, thus, the genre identifier of S112 is no root node to be stored in the expertise list. Since the number at S113 is not 0, the genre identifier of S113 is stored in the expertise list. The number at S121 is not 0, however, S121 is no root node and, therefore, the genre identifier of the root node S12 is stored in the expertise list.

For determining the number of appearances S2005 that is used in the determining S2005 and S3000 for the first set, the method may comprise the following steps alone or in combination. The same steps may be carried out with respect to the numbers used in the determining S2010 and S3005 for the second set:

Removing music identifiers representing exact duplicates of pieces of music. This step corresponds to the one as described above when referring to FIGS. 5 and 6, Removing performer identifier variations representing the same performer. This step corresponds to the one as described above when referring to FIGS. 5 and 6, and Removing a performer identifier for which the number of appearances of music identifiers attributed to the performer identifier does not reach a predetermined threshold value. This threshold value may be denoted "MinBandThreshold".

This MinBandThreshold may vary from performer identifier to performer identifier and for a performer identifier over time.

Figure 25:
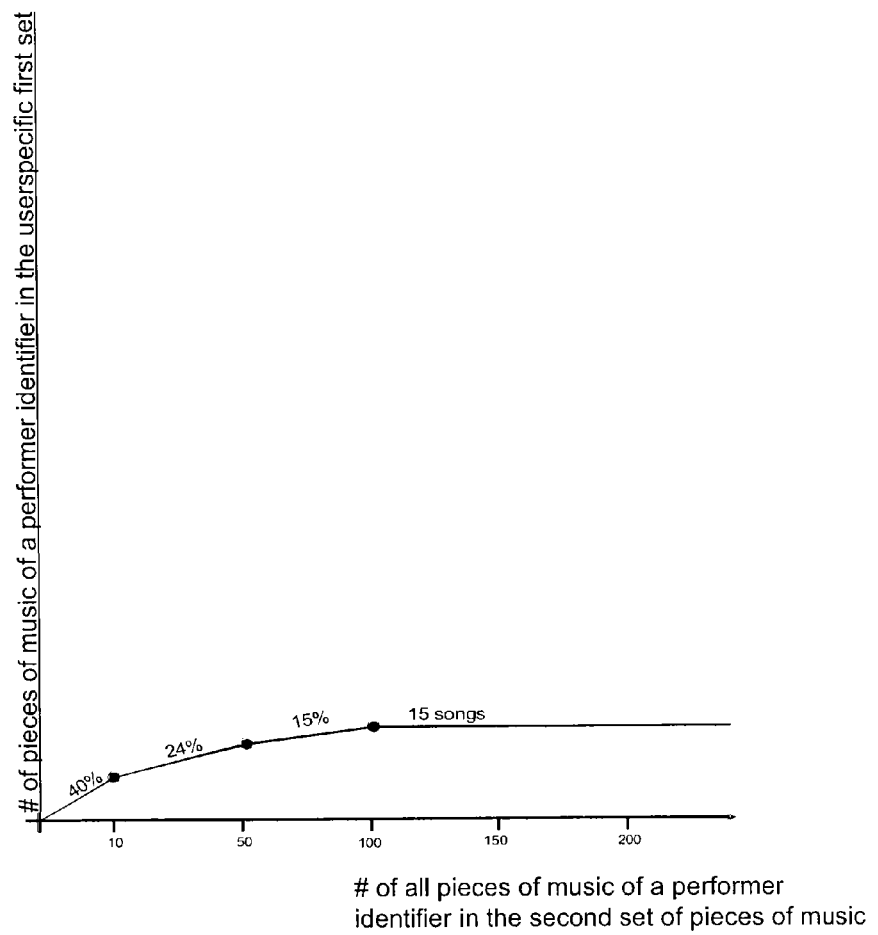
FIG. 25 is a chart illustrating the function minimum threshold.

The MinBandThreshold may be a function that depends on the number of pieces of music that a band has published in total. Thus, the MinBandThreshold may be set differently for different number of pieces of music that a band has published in total. The MinBandThreshold values for different number of pieces of music that a band has published in total and/or the number of pieces of music that a band has published in total for the individual bands may be provided with or in the second set of music identifiers. In other words, the number of appearances of music identifiers attributed to a band in the first set of music that must at least be reached or exceeded may differ depending on the number of pieces of music that a band has published in total. By applying the MinBandThreshold a minimum number of pieces of music attributed to a band that have to be stored in the user specific first set of music identifiers to be within the user's music taste is specified. A band of which not a predetermined number of pieces of music is present in the first set of pieces of music identifiers exceeds a value in relation to the number of pieces of music that a band has published in total may be disregarded when determining the entries for the expertise list. This value may be a function of the number of pieces of music that a band has published in total. An example of the function is illustrated in FIG. 25. According to this example, until 10 total pieces of music of a performer identifier the MinBandThreshold is 40%, until 50 pieces of music 24%, until 100 pieces of music 15% and 15 pieces of music (and not a percentage) for more than 100 total pieces of music. The MinBandThreshold data may be provided as a look-up table or as a mathematical function such as MinBandThreshold (number of pieces of music that a band has published in total). The number of songs that a band/performer identifier has published may be stored separately in a database associated with the performer identifier or may be determined as a total number of appearances of pieces of music identifiers associated with the respective performer identifier. In other words, a server used for providing a database storing the second set of music identifiers may store a number as a number of published songs or this number may be determined based on the pieces of music in the database. The first option may be updated independently. The second option, however, does not require additional external input.

Figure 26:
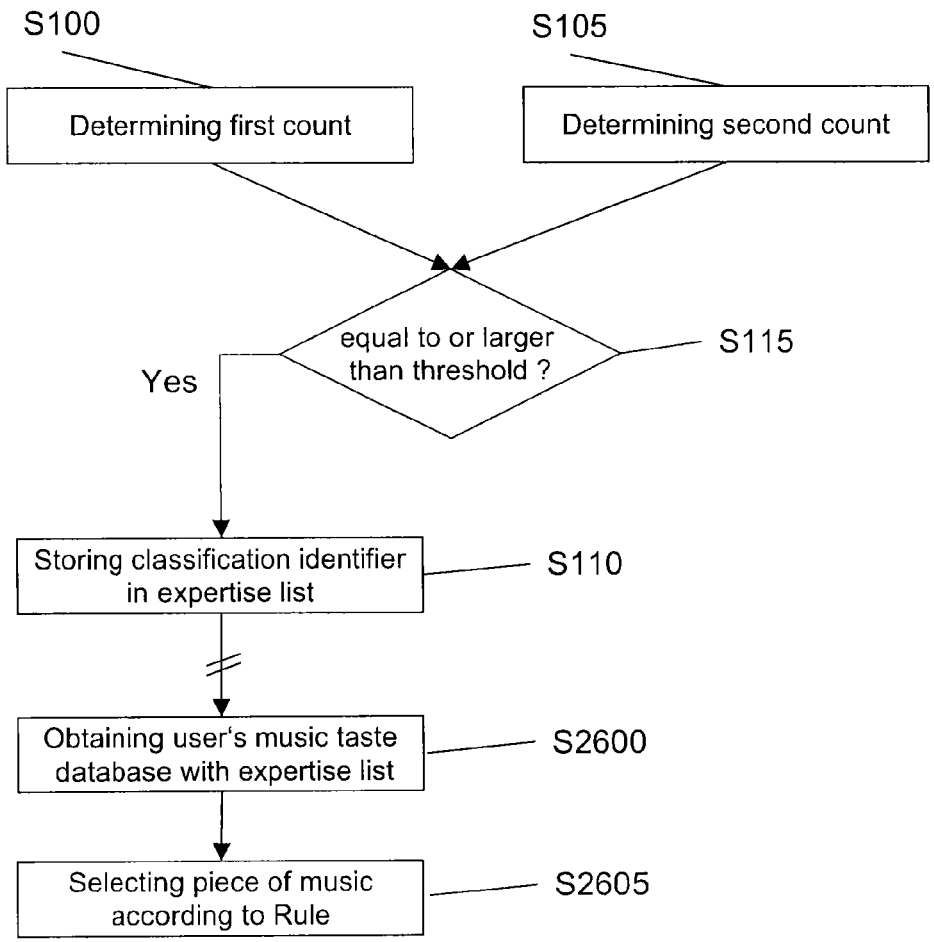
FIG. 26 illustrates a flow chart of one embodiment for selecting a piece of music using a user music taste database including an expertise list.

The expertise list that is stored in any one of the embodiments that have been described above may be used for selecting a piece of music for recommendation. A selection method may comprise, as illustrated in FIG. 26, generating a user music taste database by one of the methods as described above storing an expertise list, selecting S2605 a piece of music from the second set of music identifiers not included in the first set or in a third set of music identifiers according to one rule or a combination of rules selected from the following:

- if a genre identifier is identified in the user music taste database as being liked, select a piece of music being attributed to the genre identifier,
- if a performer identifier is identified in the user music taste database as being liked, select a piece of music from this performer identifier,
- if a popularity indicator indicating a performer as being popular attributed to a performer identifier is present and if this performer identifier is not identified in the user music taste database as being liked, do not select a piece of music attributed to this performer identifier from a genre that is stored in the genre expertise list of the user music taste database and that is identified in the user music taste database as being liked,
- if a performer identifier, as the selected classification identifier, is stored in the expertise list and a publication date associated with a music identifier of this performer identifiers is not within a predetermined time period before carrying out the method, do not select a piece of music attributed to this music identifier,
- do not select a piece of music only because it is from a performer identifier that is labeled to be similar to a performer identifier that is included in user music taste database and that is identified in the user music taste database as being liked, and
- do not select a piece of music only because the associated music identifier is labeled to be similar to a music identifier that is included in user music taste data-base and that is identified in the user music taste database as being liked.

That is, the set of Rules may comprise positive and/or negative rules.

The set of Rules may further include a rule that all or some or at least the above-described rules do not apply to new songs. New songs may be selected independently from any rules such as the expertise-based rules. A song may be new if it has been publicly available only for a predetermined time before carrying out the selection method. The predetermined time may be a threshold value and may be denoted "NumOfDaysASongIsNew". The NumOfDaysASongIsNew may be 30*6=180 days.

As illustrated in FIG. 26, the user music taste database may be generated independently form the selecting step. Therefore, a previously generated user music taste database may be obtained S2600 for the selecting S2605.

The third set of music identifiers may be music identifiers that are associated with the specific user. For example, the third set of music identifiers may correspond to the music identifiers currently, for example at the time of selecting a piece of music according to the rules, stored in a music database. The music database may correspond to an updated list of music identifiers that has been used for generating the expertise list. For example, the database may be monitored constantly for including any pieces of music identifiers to which the user had contact e, g. were downloaded, listened to or a like. The third set of music identifiers may include music identifiers that are stored in different databases associated with the user, e.g. in a server-based service that provides music identifiers obtained from and/or provided to different devices. The first set of music identifiers and the third set of music identifiers may be identical. By changes over the time and also by selecting a specific set of music identifiers as first set of music identifiers, there may exist more or different music identifiers being associated with pieces of music the user knows than the ones used for determining the expertise list. These music identifiers may also not be provided or recommended to the user.

Figure 27:
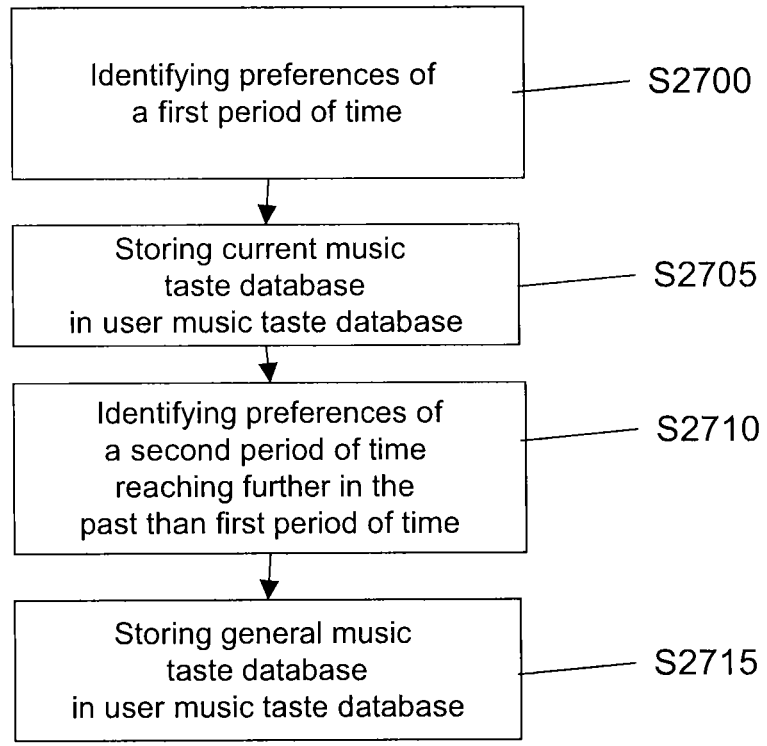
FIG. 27 illustrates a flow chart of one embodiment for generating a user music taste database including an general music taste database and a current music taste database.

In FIG. 27 another embodiment of a method for generating a user music taste database is illustrated. The embodiment comprises identifying S2700 user preferences associated with pieces of music over a first time period, storing S2705 the user preferences of the first time period in the user music taste database as general music taste database, identifying S2710 the user preferences associated with pieces of music over a second time period, and storing S2715 the user preferences of the second time period in the user music taste database as current music taste database, wherein the first time period includes a time period that reaches further in the past than the second time period.

Figure 28:
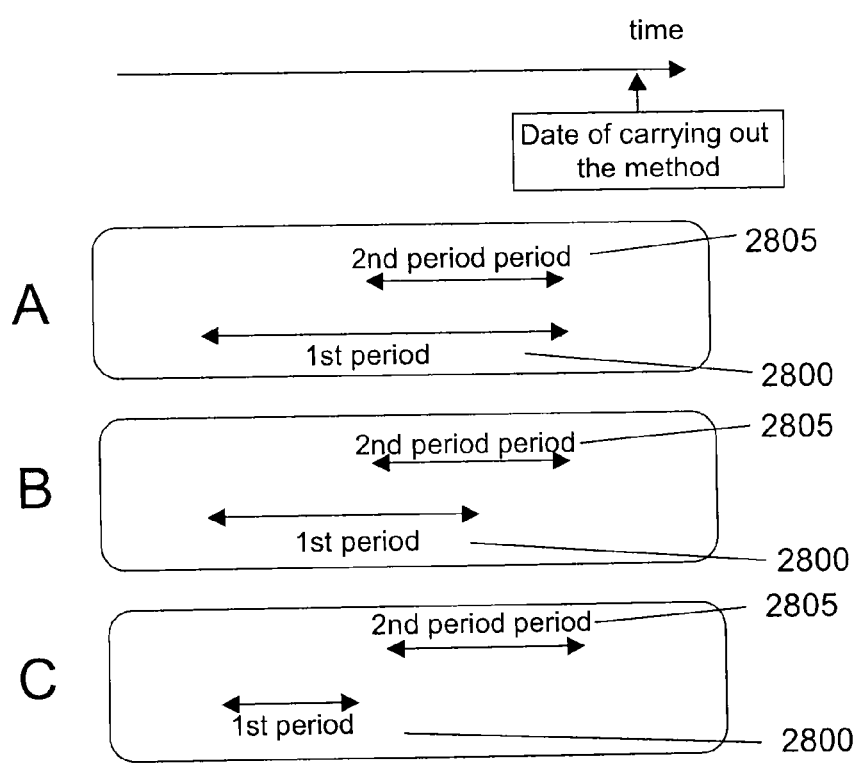
FIG. 28 illustrates different embodiments of the first and second time periods relative to each other.

In FIG. 28 different relative positions of the first time period 2800 and the second time period 2805 are illustrated. The first time period 2800 may have the same end date as the second time period 2805, case A, the first time period 2800 may overlap with the second time period 2805, case B, or the first time period 2800 may completely lie before the second time period 2805, case C. Further, the end of the second time period may be at the date of carrying out the method or may be at predetermined date prior to the date of carrying out the method.

Figure 29:
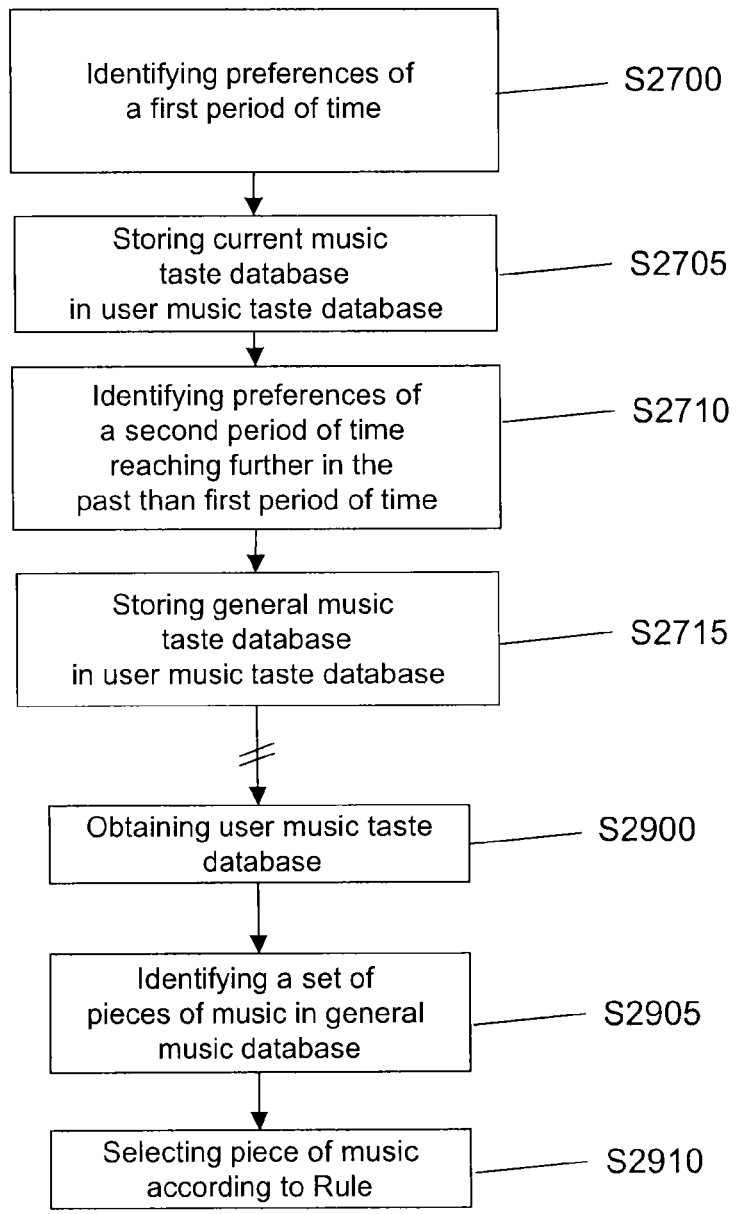
FIG. 29 illustrates a flow chart of one embodiment for selecting a piece of music using a user music taste database including an a general music taste database and a current music taste database.

The general music taste database and the current music taste database that are stored in any one of the embodiments described above may be used for selecting a piece of music for recommendation. The selection method may comprise, as illustrated in FIG. 29, obtaining a user music taste database S2900 generated by one of the methods as described above, storing a general music taste database and a current music taste database, identifying S2905 a set of pieces of music in a general pieces of music database that are not included in a user pieces of music database associated with the user, and selecting S2910 the pieces of music from the set of pieces of music user according to at least one rule based on the general music taste database and the current music taste database. The user pieces of music database associated with the user may be the first set of music identifiers or any other user specific set of music identifiers. The other user specific set of music identifiers may be based on the first set of music identifiers that has been used for generating the expertise list and that has been amended, e.g. by new entries. Such a method may allow adopting the recommendation result to the interests of a user or a content provider, e.g. the user or content provider may set the rules according to his interests. Further, the method may allow selecting whether a recommendation is rather reflecting the current taste or a general taste. Further, the method may allow determining a music taste development over time. This may be used for prediction of the development of the taste in the future or for influencing the future taste.

The rule may be a set of rules that are applied partially, separately or in combination with respect to a piece of music. The set of rules may include:
- if a genre is identified in the user music taste database as being liked, select a piece of music from this genre,
- if a performer identifier is identified in the user music taste database as being liked, select a piece of music from this performer identifier,
- if a performer identifier is labeled as being popular and if this performer identifier is not identified in the user music taste database as being liked, do not select a piece of music associated with this performer identifier from a genre that is stored in the genre expertise list of the user music taste database and that is identified in the user music taste database as being liked,
- if a performer identifier is stored in the expertise list and a publication date associated with a music identifier of this performer identifiers is not within a predetermined time period before carrying out the method, do not select a piece of music associated with this music identifier,
- do not select a piece of music only because it is from a performer identifier that is labeled to be similar to a performer identifier that is included in user music taste database and that is identified in the user music taste database as being liked, and
- do not select a piece of music only because the associated music identifier is labeled to be similar to a music identifier that is included in user music taste database and that is identified in the user music taste database as being liked.

Any rule or set of rule for selecting a piece of music may be denoted a "music filter".

Figure 30:
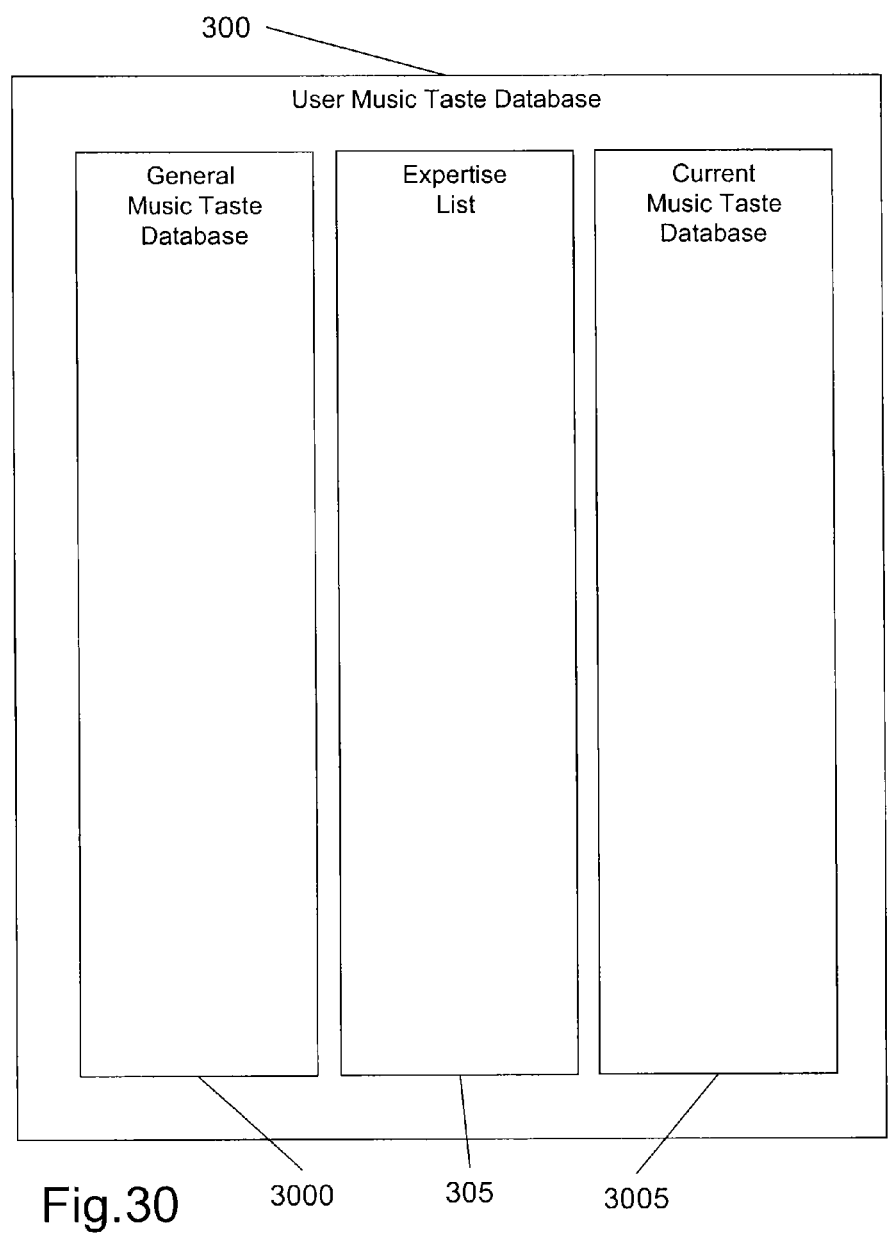
FIG. 30 schematically illustrates a user music taste database generated by combining the embodiments of FIG. 1 and FIG. 20.
Figure 31:
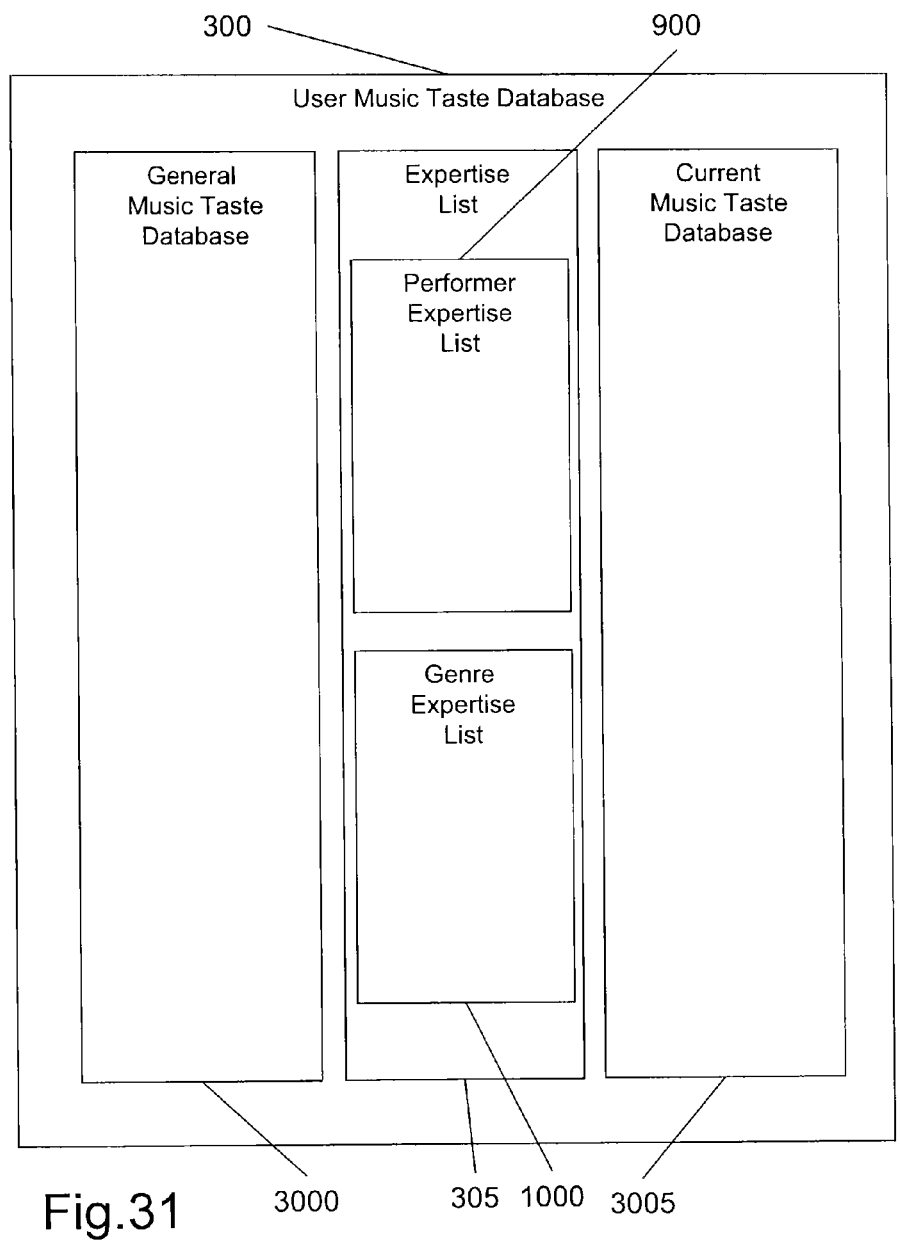
FIG. 31 schematically illustrates a user music taste database generated by combining the embodiments of FIG. 1 and FIG. 20 for both performer identifier and genre identifier.

In one embodiment the method that is described when referring to FIG. 27 may be combined with any of the methods in which an expertise list is stored as described above, thereby obtaining a user music taste database 300 comprising the general music taste database 3000, the expertise list 305 and the current music taste database 3005, as illustrated in FIG. 30. In one embodiment the user music taste database 300 comprises the general music taste database 3000, the expertise list 305 including a performer expertise list 900 and/or a genre expertise list 1000 and the current music taste database 3005, as illustrated in FIG. 31.

Figure 32:
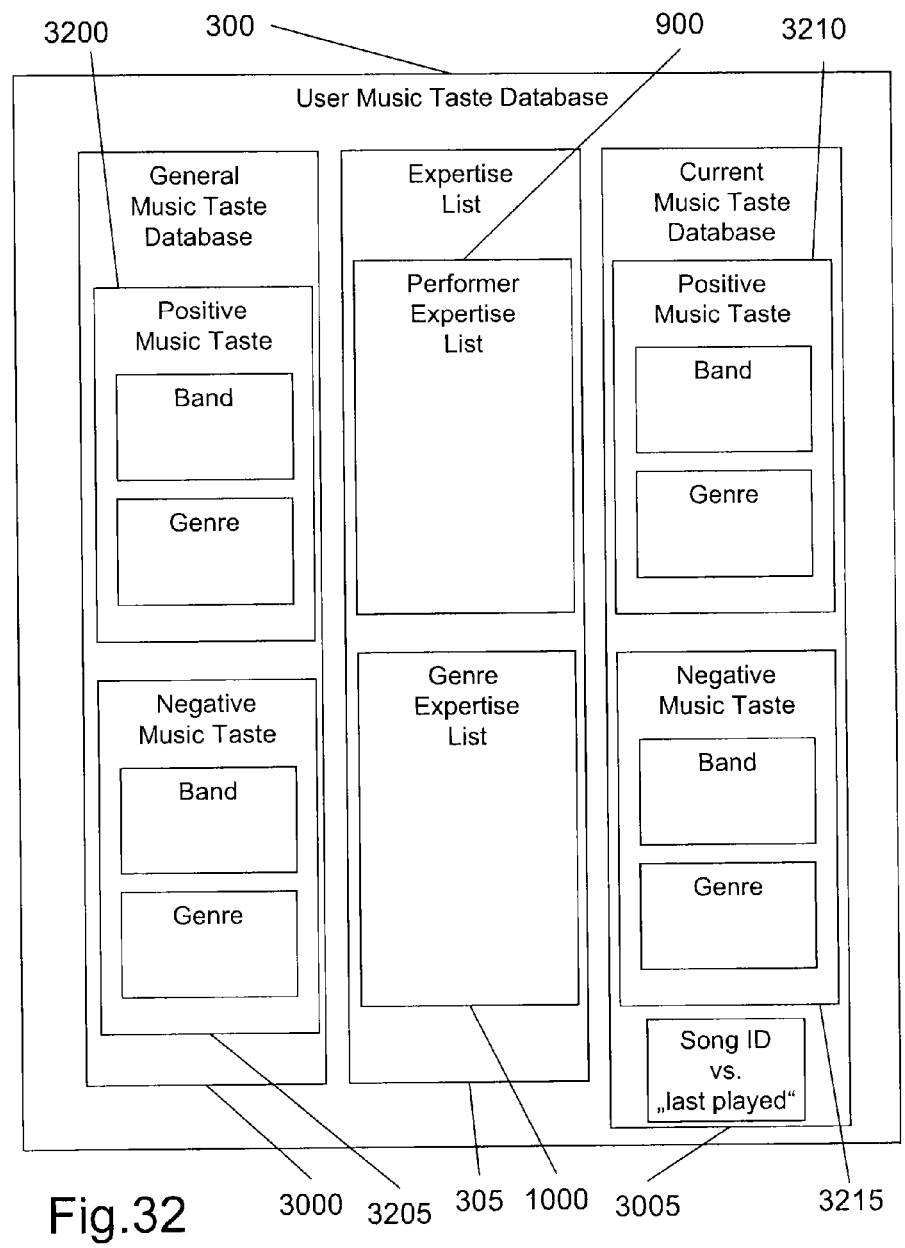
FIG. 32 schematically illustrates a user music taste database generated by combining the embodiments as illustrated in FIG. 31 with positive and negative music taste information and "last played songs" database.

In one embodiment the general music taste database 3000 may comprise a database representing the positive music taste 3200 and a database representing the negative music taste 3205. In another embodiment the positive music taste and the negative music taste may be included in a common general music taste database. Further, the current music taste database 3005 may comprise a database representing the positive music taste 3210 and a database representing the negative music taste 3215 as illustrated in FIG. 32. In another embodiment the positive music taste and the negative music taste may be included in a common current music taste database. In another embodiment the general music taste and the current music taste may be included in a common music taste database that may further include an expertise list. Thus, the entries in the music taste database may be arranged in any manner as long as the respective information is provided, in other words the data structure may include information referring to the type of information, for example expertise information and alike, music taste information together with the entry of the specific information, e.g. genre identifier, performer identifier and alike.

The positive music taste databases 3200 and 3210 differ with respect to the time periods which they reflect (general vs. current, see above) and include performer identifiers and/or genre identifiers the user "likes". The negative music taste databases 3205 and 3215 differ with respect to the time periods which they reflect (general vs. current, see above) and include performer identifiers and/or genre identifiers the user "dislikes". The positive music taste databases 3200, 3210 and negative music taste databases 3205, 3215 may have the same structure.

Figure 33:
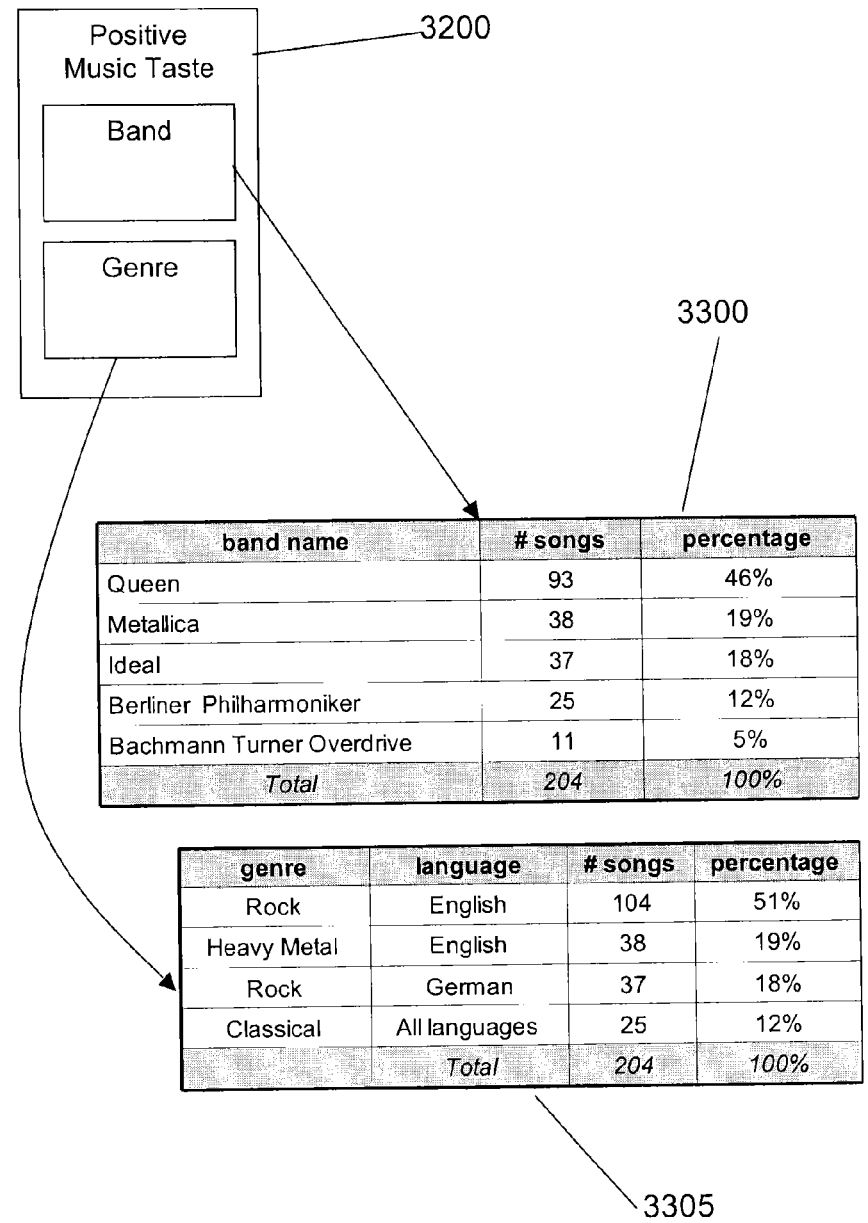
FIG. 33 illustrates a positive music taste database for arbitrarily selected identifiers.
Figure 34:
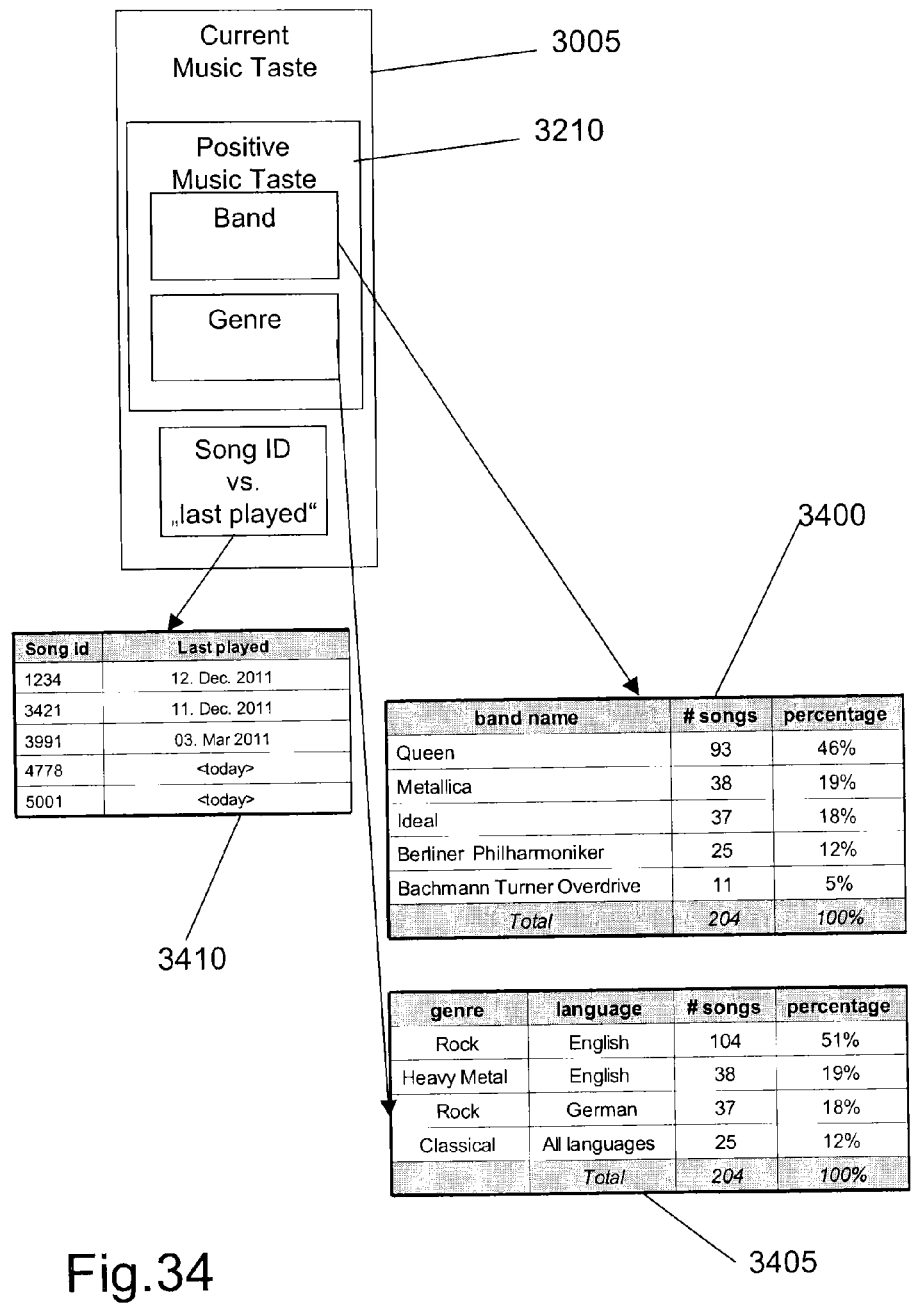
FIG. 34 illustrates a current music taste database including a positive music taste database and a "last played songs" database for arbitrarily selected identifiers.

The structure is illustrated in FIGS. 33 and 34 for the positive music taste databases 3200 and 3210. In a first section 3300, 3400 performer identifiers, e.g. band names or artists (or any performing institution that can be named), may be listed that are represented by an amount of pieces of music, e.g. songs, above a certain MinBandThreshold. In a second section 3305, 3405 genre identifiers or sub-genre identifiers—see tree structure as described above—, e.g. the name of the genres, may be listed that are represented by an amount of pieces of music, i.e. songs, or performer identifiers above a certain MinGenreThreshold number. The genre identifiers or sub-genre identifiers may be presented in combination with a language. Further, the percentage value of the amount of pieces of music in comparison to all pieces of music may be included in the list.

In the example of FIGS. 33 and 34, the first section 3300, 3400 comprises entries representing bands or orchestras. The second section 3305, 3405 comprises 4 entries each containing a (sub-)genre and a language (with the meta-language entry "All languages" that matches every language as Classical (Western) music is often language-independent).

The current music taste database 3005 may comprise a section 3410 comprising pairs of music identifiers and a "last played" date. These dates may either be actual dates or pseudo dates, e.g. "today" dates that always result in the current date.

The user music taste model, upon which the user music taste database 300, illustrated in FIG. 32, may be generated, may therefore be based on the following.

A user has a (general) music taste. This taste is changing only slowly and affects mainly certain genres and bands.

A user has a current music taste. This taste might change quickly and affects mainly single songs and newly discovered bands. A song can be part of the (general) music taste, but still not be part of the current music taste, e.g. because it was heard too many times a short while ago.

A user might like a (sub) genre in total except some bands and/or sub genres and or time periods. Liking a genre is a quite strong statement (and will probably happen less often than liking a group of bands in one genre). It means basically, that, no matter what the band or the song, it is probable that the user will like a song of this genre. For this to happen it is therefore very important that the genre model is very articulated and covers all user-perceived music categories worldwide. A (sub)genre is liked by a user if the genre is represented in the music set of the user with equal to or more than MinGenreThreshold songs.

The genres may be subdivided by languages. A language makes a new genre, i.e. the user can like a genre in one language, but possibly not in another language.

A user can be an expert for a genre. If a user is an expert for a genre, he/she knows at least the popular bands of this genre. A user may be considered to be an expert for a genre if the user likes equal to or more than GenreExpertLevel percent of the popular bands in this genre.

A user might like a band in total except some songs and/or time periods if this band is not covered by liking a genre.

Although the user does not like some genres in general, he/she might like some bands from these genres. A user might like songs from a certain period of one band, but not such from another period. A band may be considered to be liked by a user if the band is represented in the music set of the user with equal to or more than MinBandThreshold songs.

A user can be an expert for a band. If a user is an expert for a band, he/she knows almost the complete works of this band so far unless songs are published less than NumOfDaysASongIsNew days ago. A user may be an expert for a band if he likes equal to or more than BandExpertLevel percent of the band's work.

A band can be either popular or not popular. This binary value shall denote whether a band is known by the majority of users that like the genre this band belongs to or not.

A user might like single songs that are not covered by liking a genre or a band. Independent of the genres and bands a user might like in general he/she might like single songs even if they are from other genres or bands.

A song is a new song if there is no data that the user ever listened to this song.

Criteria in this model are

NumOfDaysASongIsNew (example: 6*30=180 days)

MinBandThreshold (example: function in FIG. 5)

MinGenreThreshold (example: 100 songs)

BandExpertLevel (example: 50%)

GenreExpertLevel (example: 50%)

Using the own user's music taste and employing the above set of rules is not the only way to select music that might be of interest for a user. Instead, also the music taste of other, "similar" users may be employed. Such a system is often called a user to user (u2u) based recommendation system. A u2u based system defines a similarity function between the user profile of the current user (the "target user") and other users from the user set of the same system. The other users that show the highest similarity to the target user may be selected as his "buddies", and from the songs the "buddies" like, a recommendation for the target user may be chosen. The user music taste database that is generated according to one of the methods a described above may allow for a better matching of the target user with his potential "buddies". The current music taste may allow for incorporation of the time dimension into the recommendation—this is where recommendation systems are usually particularly weak, since little collaborative information is available for newer songs.

Another embodiment is a computer program including computer-program instructions, which, when executed by a computer, cause the computer to perform any of the methods described above.

Another embodiment is a non-transitory computer-readable medium including the computer program including computer-program instructions, which, when executed by a computer, cause the computer to perform any of the method described above.

Figure 35:
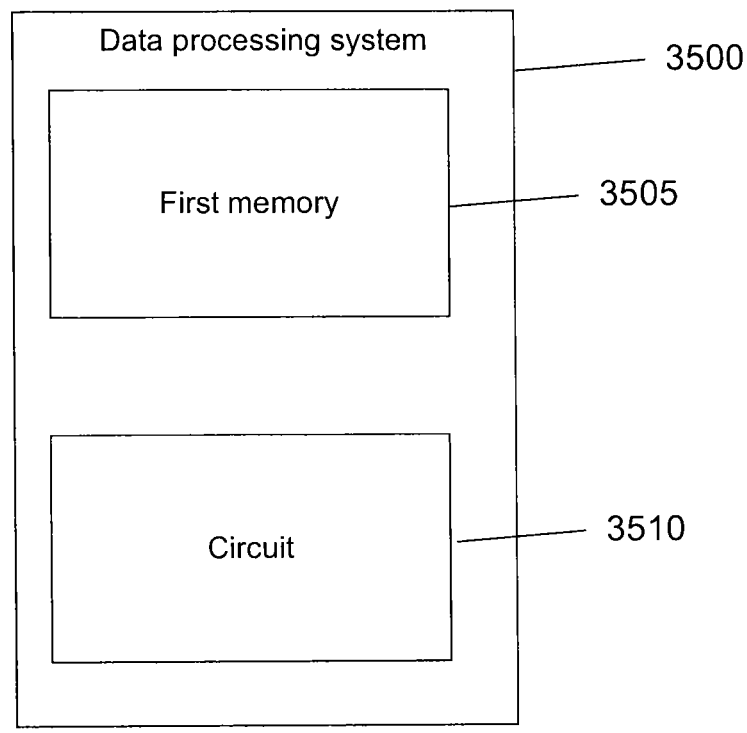
FIG. 35 illustrates an embodiment of a data processing system for generating a user music taste database including an expertise list.

In FIG. 35 a data processing system 3500 for generating a user music taste database including an expertise list as described above is illustrated. The data processing system comprises a first memory 3505 to store a user specific first set of music identifiers, wherein classification identifiers are attributed to the music identifiers in the first set of music identifiers, and a circuit 3510 configured to perform the functions of determining, as a first count, the number of appearances of a selected classification identifier of the classification identifiers in the user specific first set of music identifiers for pieces of music, determining, as a second count, the number of appearances of the selected classification identifier in a second set of music identifiers for pieces of music, wherein classification identifiers are attributed to the music identifiers in the second set of music identifiers, and storing, if a value determined from setting the first count and the second count in relation to each other is equal to or larger than a predetermined expertise level threshold value, a classification identifier related to the selected classification identifier in an expertise list in the user music taste database in the first memory 3505 or a second memory 3510.

Figure 36:
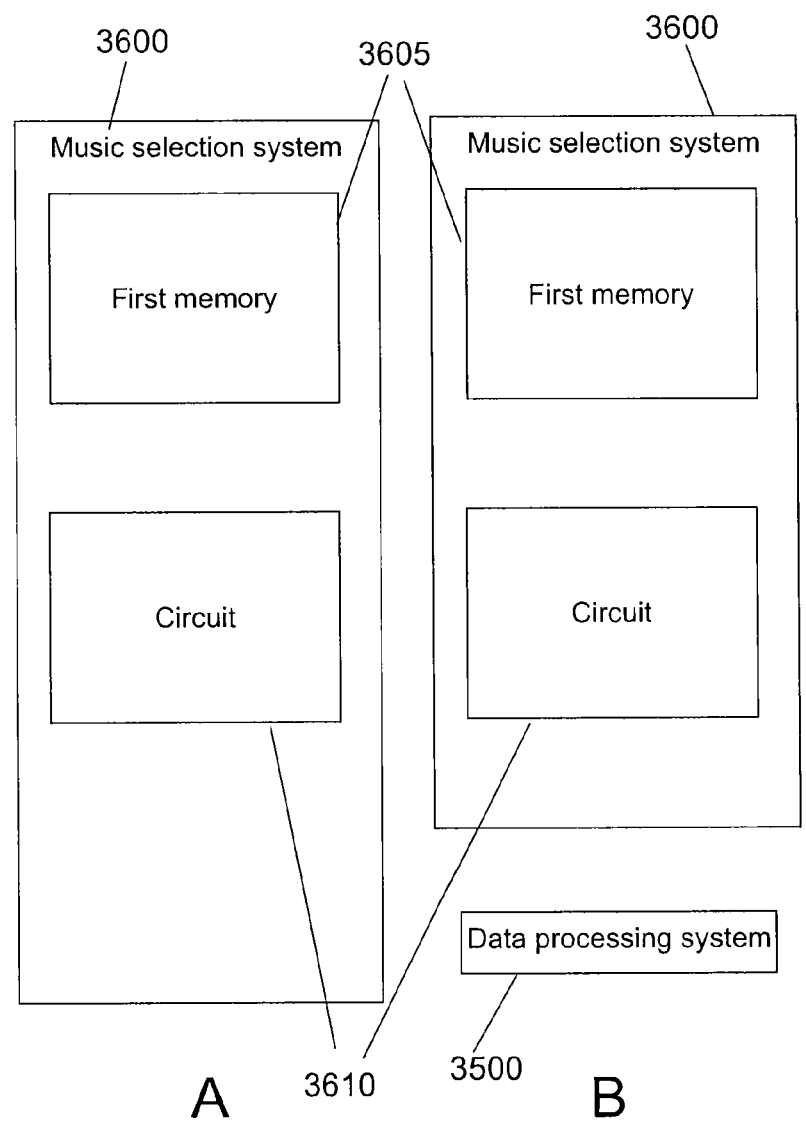
FIG. 36 illustrates an embodiment of a music selection system for selecting a piece of music using a user music taste database including an expertise list.

In FIG. 36 a music piece selection system 3600 for selecting a piece of music using an expertise list is illustrated. The music piece selection system 3600 comprises a memory 3605 to store a third set of music identifiers, and a circuit 3610 configured to perform the functions of gathering the user music taste database generated by a system 3500, gathering a user specific fourth set of music identifiers, identifying, in a fifth set, the music identifiers that are included in the third set but not in the fourth set; and selecting a music identifier from the fifth set according to at least one rule based on the expertise list in the user music taste database.

It is noted that the expression "gathering" has the meaning that the music piece selection system 3600 may be a music piece selection system that is configured to carry out the processing for obtaining the corresponding information by the circuit 3610, i.e. the circuit 3610 includes the functionalities of the circuit 3510 and the third memory 3605 corresponds to the memory 3505 or a music piece selection system that receives the corresponding information from a separate circuit. This is illustrated by the embodiments A and B in FIG. 36.

Figure 37:
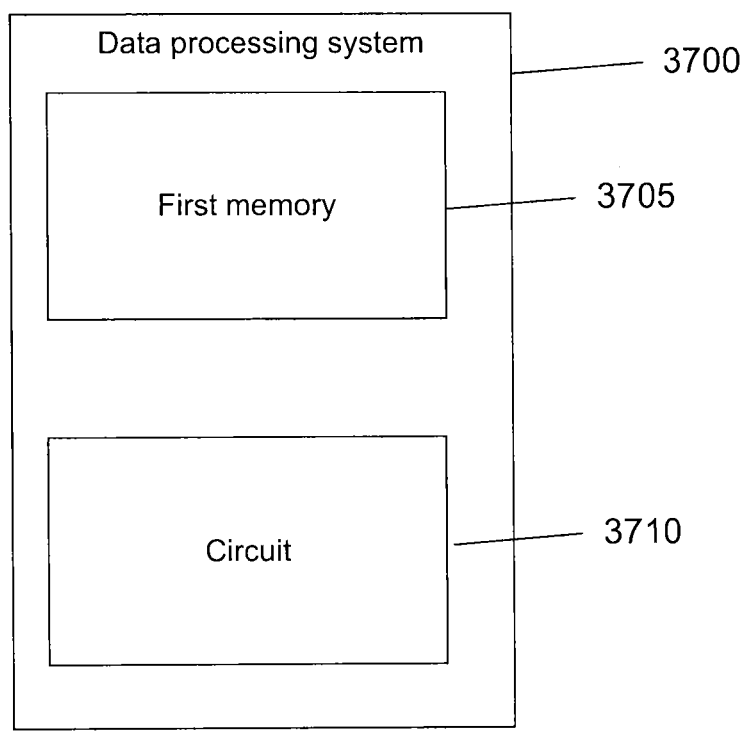
FIG. 37 illustrates an embodiment of a data processing system for generating a user music taste database including a current music taste database.

In FIG. 37 a data processing system 3700 for generating a user music taste database including a current music taste database as described above is illustrated. The data processing system comprises a memory 3705 to store user preferences in association with a time label, and a circuit 3710 configured to perform the functions of identifying the user preferences associated with music pieces with the time label corresponding to a first time period, identifying the user preferences associated with music pieces with the time label corresponding to a second time period, wherein the first time period includes a time period that reaches further in the past than the second time period, and storing in the first memory or a second memory the user preferences of the first time period in a user music taste database as general music taste database and to store the user preferences of the second time period in the user music taste database as current music taste database.

Figure 38:
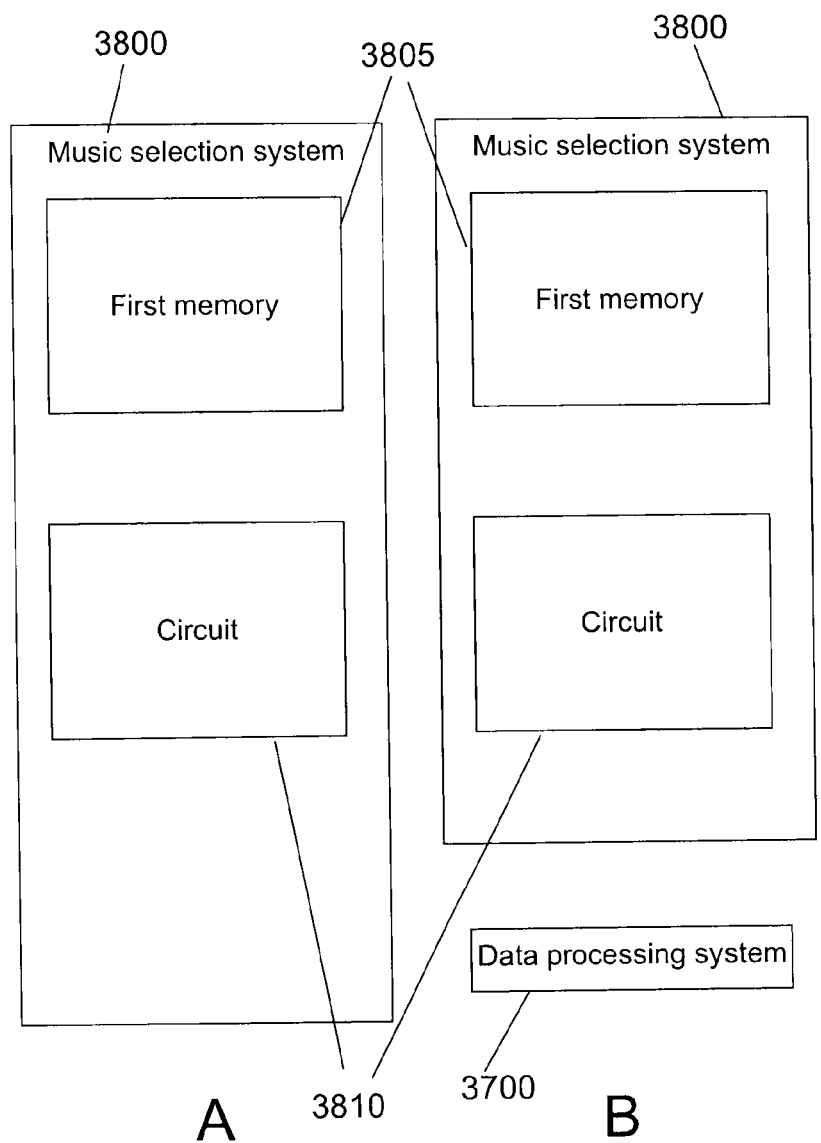
FIG. 38 illustrates an embodiment of a music selection system for selecting a piece of music using a user music taste database including a current music taste database.

In FIG. 38 a music piece selection system 3800 for selecting a piece of music using an current music taste database is illustrated. The music piece selection system comprises a memory 3805 to store a first set of music identifiers, and a circuit 3810 configured to perform the functions of gathering the user music taste database generated by system 3700, gathering a user specific second set of music identifiers, identifying, in a third set, the music identifiers that are included in the first set but not in the second set, and selecting music identifiers from the third set according to at least one rule based on the general music taste database and the current music taste database.

It is noted that the expression "gathering" has the meaning that the music piece selection system 3800 may be a music piece selection system that is configured to carry out the processing for generating the corresponding information by the circuit 3810, i.e. the circuit 3810 includes the functionalities of the circuit 3710 and the memory 3805 corresponds to the memory 3705 or a music piece selection system 3800 that receives the corresponding information from a separate circuit 3700. This is illustrated by the embodiments A and B in FIG. 38.

A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit does includes the executing software of for executing the above-described methods on hardware.

Figure 39:
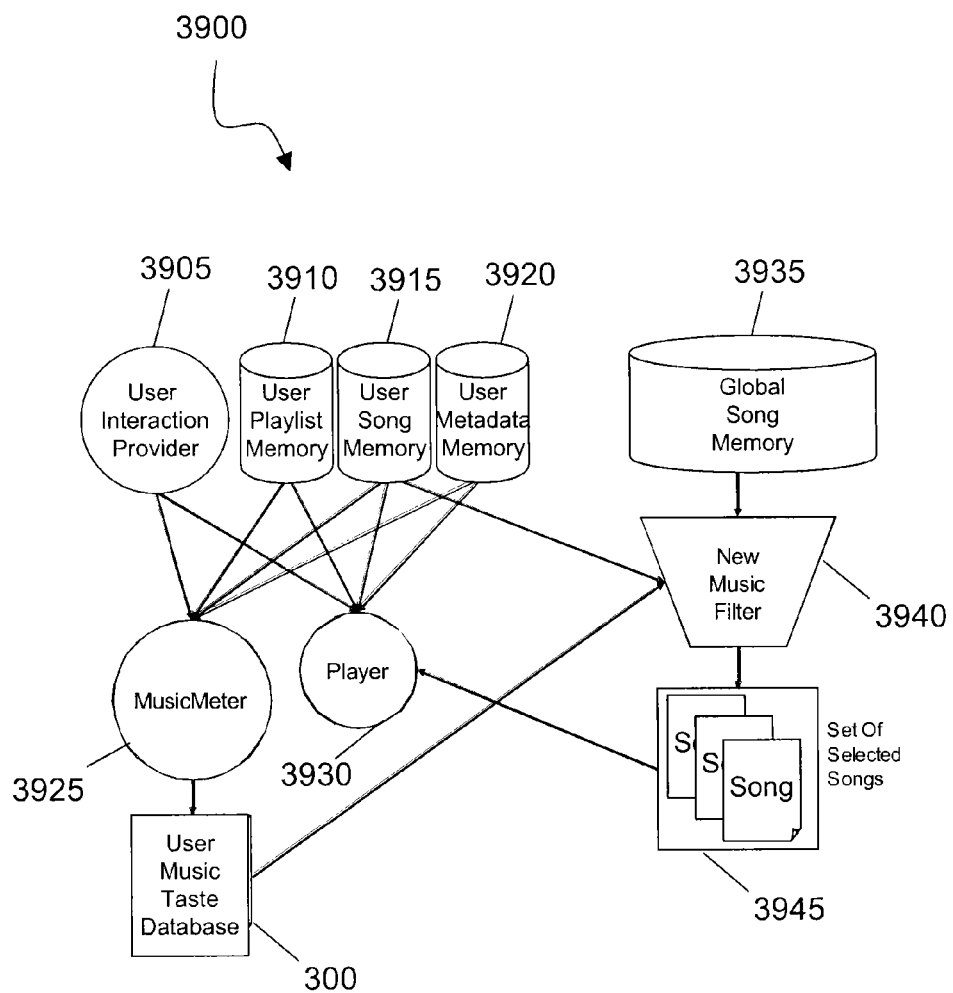
FIG. 39 illustrates an embodiment of system architecture.

FIG. 39 illustrates an embodiment of a system architecture 3900 which may be used for carrying out the generating of the user music taste database and the selection of a song as described above.

The system may comprise as modules a user interaction provider 3905, a user playlist memory 3910, a song memory 3915, a song metadata memory 3920 and a user music taste database 300. These modules are specific for a user.

Further, the system may comprise as modules a MusicMeter 3925, a player 3930, a global song memory 3935, and a music filter 3940. These modules are not specific for a user.

The selected song may be obtained in a set of selected songs 3945.

The user interactions provider 3905 may inform the MusicMeter 3925 and the player 3930 when the user selects one of the following actions when a piece of music is played:

"like": The user likes the currently played piece of music
"dislike": The user dislikes the currently played piece of music
"skip": The user wants to skip the currently played piece of music, but does not want to use "like" or "dislike".

The user playlist memory 3910 includes playlists the user has created for the player 3930 or an account in the music service.

The user song memory 3915 includes pieces of music the user has stored in his/her player or in the music service he/she uses (in some services this is called "music library").

The song playout metadata memory 3915 stores the playout history of the pieces of music in the User Song Memory module, i.e. each occurrence of a "like"
"dislike"
"skip"

action by the user for a certain piece of music. This may happen when the player 3930 notifies the song playout metadata memory 3920 about the occurrence of one of these actions. The user of these data is the MusicMeter 3925.

The player 3930 has the functions of a standard music player that takes into account the users Song memory 3915, the user playlist memory 3910, and the User Interactions Provider 3905. Additionally, the player 3930 takes into account also the set of selected songs 3945 produced by the music filter 3940. According to a music selection mechanism the player 3930 may mix songs the user knows (e.g. such from the User Song Memory 3915) and songs the system assumes to be both new and interesting to the user.

The MusicMeter 3925 may extract one or all of the user music taste databases, the current music taste database and the expertise list for generating the user music taste database 300 as described above from the User Song Memory 3915, the user playlist memory 3910 and the Sony playout metadata memory 3920.

The global song memory 3935 may store all the songs e.g. a music service offers. A "Song" in this context is not only the audio file, but also the set of metadata associated with that song. Metadata include e.g. the name of the song, the name of the band or artist that performs the song, the names of the albums the song is contained in, the publication date of the song, the recording date of the song, the genre of the song, and alike. Thus, the global song memory 3935 may provide the second set of music identifiers that is used for generating the user taste database 300 as described in the methods above. The global song memory 3935 may further be used to select a piece of music from.

Figure 40:
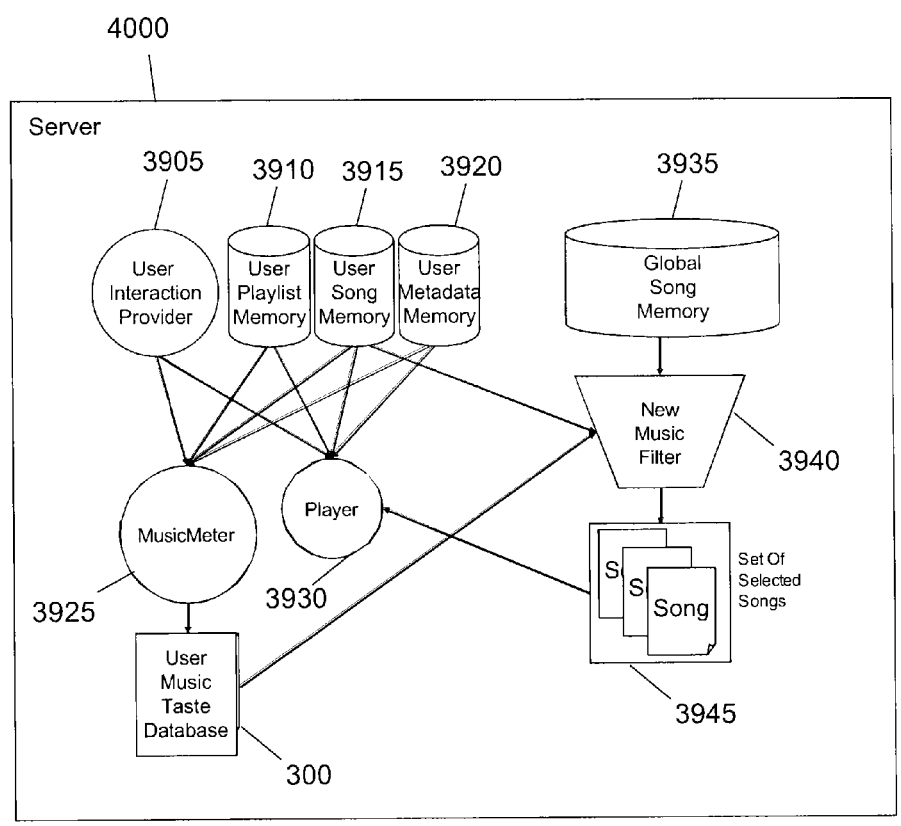
FIG. 40 illustrates an embodiment of a server with a system architecture as illustrated in FIG. 39.

According to one embodiment, as illustrated in FIG. 40, a server 4000 includes the user interaction provider 3905, the user playlist memory 3910, the song memory 3915, the song metadata memory 3920, the user music taste database 300, the MusicMeter 3925, the player 3930, the global song memory 3935, and the music filter 3940.

Figure 41:
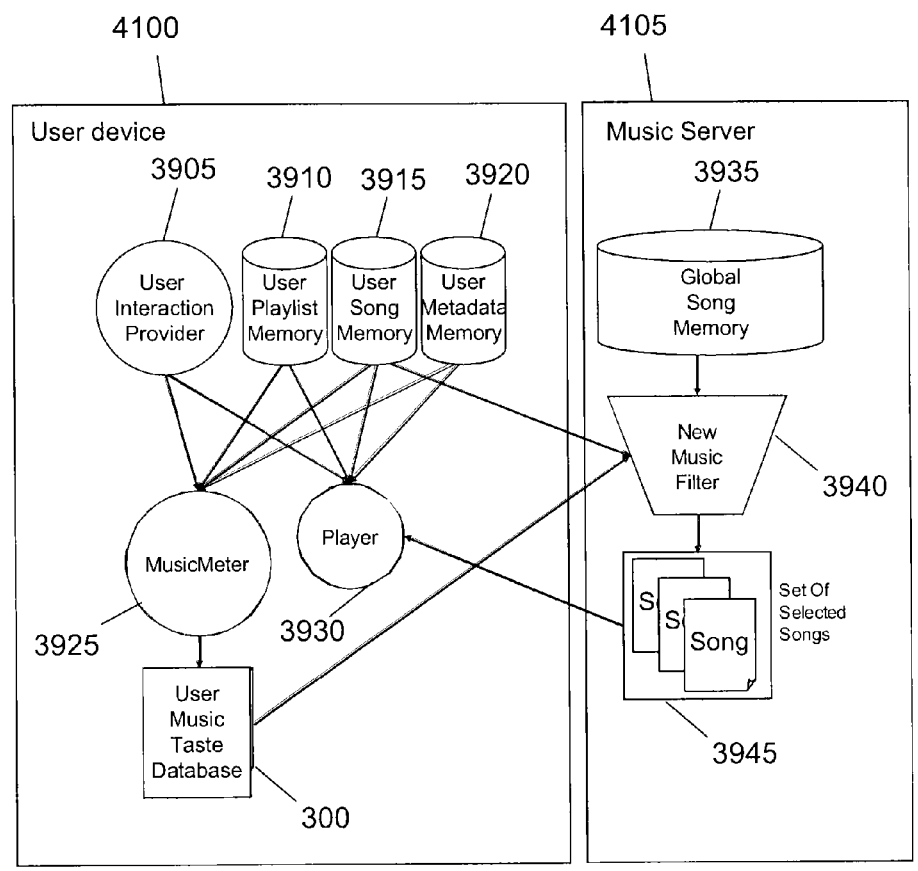
FIG. 41 illustrates an embodiment of a server—user device system with a system architecture according to FIG. 39.

According to another embodiment, as illustrated in FIG. 41, a user device 4100 includes the user interaction provider 3905, the user playlist memory 3910, the song memory 3915, the song metadata memory 3920, the user music taste database 300, the MusicMeter 3925, and the player 3930, and a music server 4105 comprises the global song memory 3935, and the music filter 3940.

The music filter 3940 is the filter that is described above for selecting a piece of music The music filter 3940 may use any one of the general music taste database, the current music taste database and the expertise list, a list of the pieces of music in user song memory 3915 and the pieces of music in the global song memory 3935 for determining a set of pieces of music from the global song memory that might be unknown to the user, and which of the unknown pieces of music be interesting to the user.

The music filter 3940 may creates the Set of Selected Songs 3945 that contains these potentially interesting, new-to-the-user pieces of music. The maximum size of this set may be determined by two parameters: SELECTED_SONG_SIZE_CURRENT_TASTE is the maximum number of songs derived from the current music taste database, SELECTED_SONG_SIZE_MUSIC_TASTE is the maximum number of songs derived from the general music taste database. In order to determine whether a user knows a piece of music from the global song memory 3935 this piece of music is simply compared to the list of pieces of music in the user song memory 3915. The following mechanism may be executed two times: first, using the current music taste database, thus producing the maximally SELECTED_SONG_SIZE_CURRENT_TASTE pieces of music of a first group, second using the general music taste database, thus resulting in maximally SELECTED_SONG_SIZE_MUSIC_TASTE pieces of music of a second group.

The set of selected songs 3545 contains pieces of music that have been selected by the music filter 3540. This set may be given to the player 3530 for inclusion into the list of pieces of music to be played. As the player 3530 may distinguish the pieces of music coming from this set 3545 from the pieces of music from the user song memory 3515, the player 3530 can employ selection mechanisms that e.g. mix both types of songs accordingly.

According to another embodiment the user music taste database is updated as described above when certain occurrences take place. This allows addressing a user's music taste change. This dynamics may not only be read from the user song memory 3515 (although also here the content may be monitored dynamically) but also may be derived from which pieces of music the user is actually listening to and from the reactions of the user upon played out pieces of music. The latter data may be derived from monitoring the User Interactions Provider 3505 that gives other modules access to the actions the user starts during using the music service.

The more actual changes may be reflected in the current music taste. In contrast to the current music taste the general music taste may represent more the long standing music taste. This is achieved by storing a window of pieces of music the user listened to without skipping as the basic "like" song set and then derive the music taste from this set. The window size may depend on a parameter CMT_WINDOW_SIZE (e.g. the last 6 months). Songs outside this window are erased from the current music taste. In addition, this set may contain some songs the user likes explicitly. These songs cannot be erased by a refresh mechanism. Finally, the current music taste also may contain a set of music pieces and derived performer identifiers and genres identifiers the user does currently not like.

The following user interaction events may be monitored:
a new song is added to the user music memory
a song is removed from the user music memory (not if out of DRM issues)
a song is listened to without skipping
a song is "liked"
a song is "disliked"
a song is skipped The required steps that reflect these events depend on those events:

A new song is added to the user music memory 3515:
If a new song is added, the user music taste database 300 may be updated accordingly. It may not needed to run the entire mechanism anew; instead one can 1) update all counts of bands and genres in the part of the user music taste database that relate to that song 2) check whether a new band or genre(s) need to be added to the general and/or current music taste and/or expertise lists.

A song is removed from the user music memory 3515 (optionally not if out of digital rights management (DRM) issues):

If a song is removed (unless the song was removed only out of DRM issues), the user music taste database 300 can be updated accordingly. It may not be necessary to run the entire mechanism anew; instead one can 1) update all counts of bands and in the part of the user music taste database that relate to that song 2) check whether a band or genre(s) need to be removed from the general and/or current music taste and/or expertise lists.

A song is listened to without skipping:
If a song is "listened to without skipping", it may be added to the positive part of the current music taste database together with the date of the entry or, if already contained, updating the date entry (i.e. publication date).

A song is "liked":
If a song is "liked", it is added to the positive part of the current music taste database without underlying the refreshing mechanism, i.e. this song may always set to be contained in this positive part.

A song is "disliked"
If a song is "disliked" it is immediately removed from the positive part of the current music taste database and the general music taste database and added to the corresponding negative parts.

A song is skipped:
This song is removed from the positive part of the current music taste database.

Figure 42:
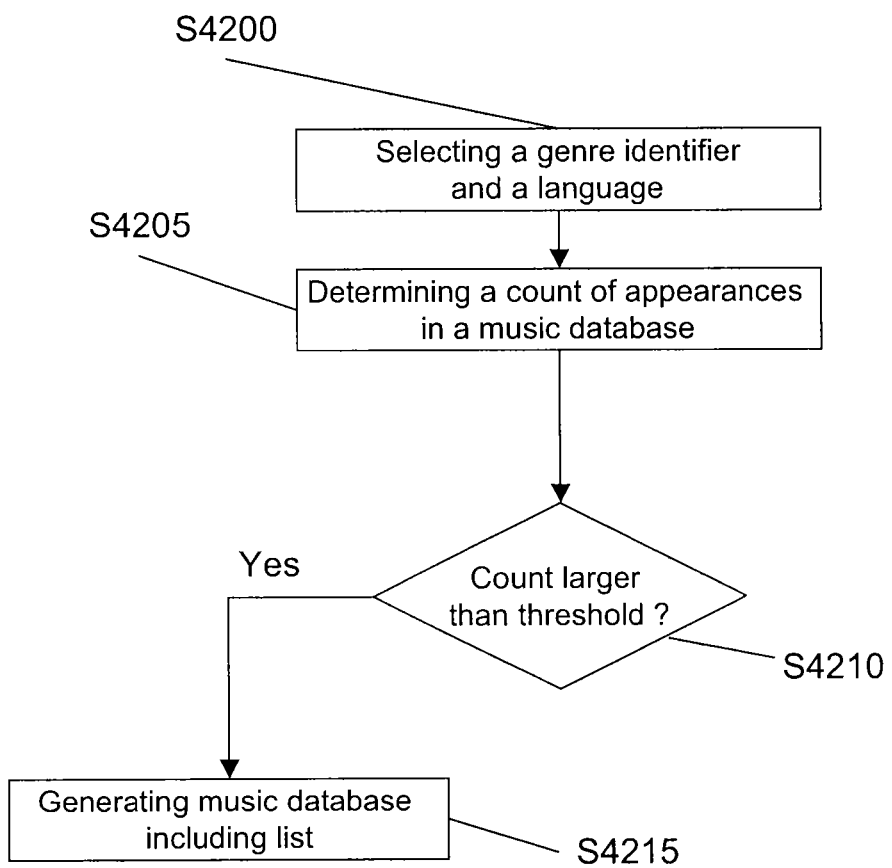
FIG. 42 illustrates a flow chart of an embodiment for generating a user music taste database including a genre list subdivided by language.

Subdividing the genre by language as it is described above is exemplified above by referring to the expertise list. The subdividing may be realized for generating any music database or music taste database using genre classifiers for classifying pieces of music by its genre, for example for generating the general music taste database and/or the current music taste database. In FIG. 42 a method for generating a music database subdivided by language is illustrated. A method for generating a music database may comprise selecting S4200 a genre identifier and a language. The language may be attributed to the genre identifier. The method may comprise further determining S4205, in a music database including a set of music identifiers, a count corresponding to a number of appearances of music identifiers or performer identifiers, which are attributed to the selected language and the selected genre identifier, The performer identifiers or the genre identifiers may be attributed to music identifiers in the music database. Further, if the count is larger than a threshold value S4210, the method may comprise generating S4215 a music database including a list including a genre identifier or a related genre identifier related to the selected genre identifier in combination with the attributed language. The threshold value may be zero or any other predetermined value larger than zero. The count may be set in relation to the total number of pieces of music in the music set and the threshold value may be a value that defines a relative value. The genre identifier may be included in the list together with the attributed language and/or with the respective count and/or with a value representing the number of positive counts relative to a total number of pieces of music in the set of pieces of music or a total number of performer identifiers attributed to the pieces of music in the set of pieces of music. The genre identifier may be included in a language specific list which is a list referring to the selected language and the genre identifier may be included in a language specific list with the respective count and/or with a value representing the number of positive counts relative to a total number of pieces of music in the set of pieces of music or a total number of performer identifiers attributed to the pieces of music in the set of pieces of music. Any of these lists may be stored in the music database. This may allow generating a music database providing a higher granularity, i.e. by taking the language into account, that may be used for a comparing music databases or selecting a piece of music for recommendation.

Figure 43:
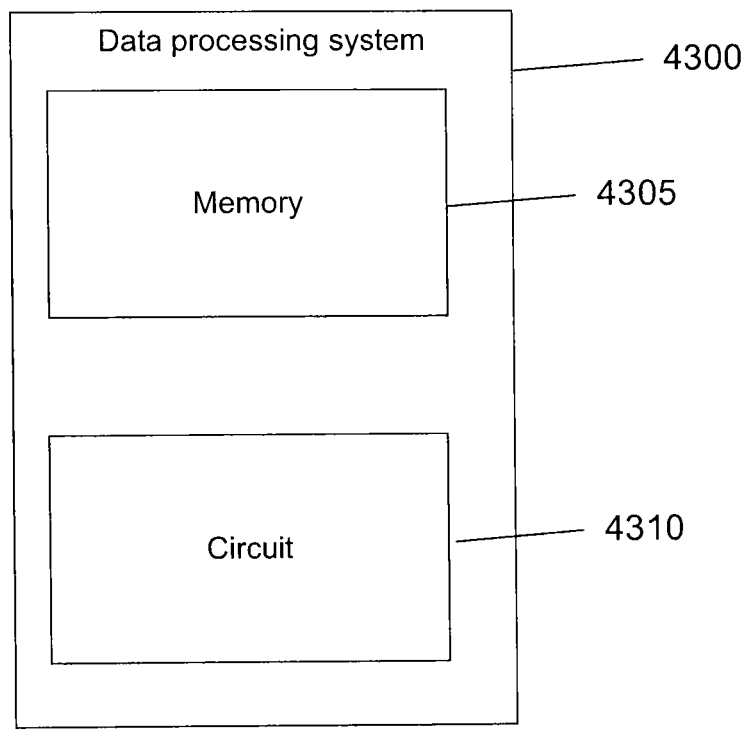
FIG. 43 illustrates an embodiment of a data processing system for generating a user music taste database including a genre list subdivided by language.

A data processing system 4300 for generating a music database including a list with genre by language, as illustrated in FIG. 43, comprises a memory 4305 for storing a music database including a set of music identifiers to which at least one a language is attributed and a circuit 4310 configured to perform the functions of selecting a genre identifier and a language, determining in the music database a count corresponding to a number of appearances of music identifiers or performer identifiers attributed to music identifiers in the music database which are attributed to the selected language and the selected genre identifier and, if the count is larger than zero, generating a music database including a list including a genre identifier or a related genre identifier related to the selected genre identifier in combination with the attributed language. The list may be stored in the music database in the memory 4305.

Obviously, numerous modifications and variations of the present disclosure are possible in light of the above teachings. It is therefore to be understood that within the scope of the appended claims, the invention may be practiced otherwise than as specifically described herein.

CROSS-REFERENCE TO RELATED APPLICATIONS

The present application claims priority of EP patent application No. 12 004 425.0 filed on 12 Jun. 2012, the entire contents of which are incorporated herein by reference.

The invention claimed is:

1. A method comprising:
storing a first set of music identifiers and classification identifiers associated with the music identifiers into a user song memory of an user's electronic device;
storing a second set of music identifiers and classification identifiers associated with the music identifiers into a global song memory of a service provider associated with a plurality of users;
counting, by circuitry of an information processing apparatus, a number of times, as a first count, that a particular classification identifier is selected from the first set stored in the user song memory of the user's electronic device;
counting, by circuitry of an information processing apparatus, a number of times, as a second count, that the same particular classification identifier is selected from the second set stored in the global song memory of the service provider;
storing, if a ratio of the first count and the second count is equal to or larger than a threshold value, a classification identifier derived from the same selected particular classification identifier into an expertise list.

2. The method according to claim 1, wherein
the classification identifiers attributed to the music identifiers in the first and in the second set of music identifiers are performer identifiers.

3. The method according to claim 1, wherein for counting of the first count and second count occurs only if the selected particular classification identifier is attributed to a music identifier associated with a publication date prior to a predetermined time.

4. The method according to claim 1, wherein
the classification identifiers attributed to the music identifiers in the first and in the second set of music identifiers are genre identifiers.

5. The method according to claim 4, wherein
performer identifiers are attributed to the music identifiers in the first set of music identifiers and in the second set of music identifiers,
the genre identifiers are attributed to the performer identifiers, and
for counting the first count and for counting the second count, all appearances of the genre identifier attributed to the same performer identifier are counted altogether as one appearance.

6. The method according to claim 4, wherein
performer identifiers are attributed to the music identifiers in the first set of music identifiers and in the second set of music identifiers,
the genre identifiers are attributed to the performer identifiers,
popularity indicators are attributed to the performer identifiers, and
for counting the first count and for counting the second count only appearances of the selected genre identifier attributed to a performer identifier that is attributed to a predetermined popularity indicator of the popularity indicators are taken as appearances.

7. The method according to claim 4, wherein
a language is attributed to at least one music identifier or performer identifier of the first set of music identifiers and of the second set of music identifiers, and
for counting the first count and for counting the second count only appearances of the selected genre identifier attributed to music identifiers or performer identifiers to which a same language is attributed is taken as appearance.

8. The method according to claim 4, wherein the genre identifier stored in the expertise list is a genre identifier of a lower level with respect to the selected genre identifier in a genre identifier tree data structure.

9. A method for selecting a piece of music for recommendation, comprising
accessing a user music taste database generated according to claim 1;
selecting, by circuitry of an information processing apparatus, a piece of music from the second set of music identifiers not included in the first or in another user specific set of music identifiers according to one rule or a combination of rules selected from the rules of,
if a genre identifier is identified in the user music taste database as being liked, select a piece of music being attributed to the genre identifier,
if a performer identifier is identified in the user music taste database as being liked and if a genre identifier attributed to the performer identifier is stored in the genre expertise list, select a piece of music from this performer identifier,
if a popularity indicator indicating a performer as being popular attributed to a performer identifier is present and if this performer identifier is not identified in the user music taste database as being liked, do not select a piece of music attributed to this performer identifier from a genre that is stored in the genre expertise list of the user music taste database and that is identified in the user music taste database as being liked,
if a performer identifier, as the selected classification identifier, is stored in the expertise list and a publication date associated with a music identifier of this performer identifiers is not within a predetermined time period before carrying out the method, do not select a piece of music attributed to this music identifier, do not select a piece of music only because it is from a performer identifier that is labeled to be similar to a performer identifier that is included in user music taste database and that is identified in the user music taste database as being liked, and do not select a piece of music only because the associated music identifier is labeled to be similar to a music identifier that is included in user music taste database and that is identified in the user music taste database as being liked.

10. A data processing system, comprising a first memory of a user's electronic device to store a first set of music identifiers and classification identifiers associated with the music identifiers;

a second memory of a service provider to store a second set of music identifiers and classification identifiers associated with the music identifiers;

a circuit configured to perform the functions of counting a number of times, as a first count, that a particular classification identifier is selected from the first set stored in the first memory;

counting a number of times, as a second count, that the same particular classification identifier is selected from the second set stored in the second memory; and storing, if a ratio of the first count and the second count is equal to or larger than a threshold value, a classification identifier derived from the same selected particular classification identifier into an expertise list.

11. A music piece selection system, comprising a memory to store a third set of music identifiers; and a circuit configured to perform the functions of gathering the expert list obtained by a system according to claim 10;

gathering a user specific fourth set of music identifiers;

identifying, in a fifth set, the music identifiers that are included in the third set but not in the fourth set; and selecting a music identifier from the fifth set according to at least one rule based on the expertise list.

* * * * *